United States Patent
Aminaka

(10) Patent No.: US 8,174,648 B2
(45) Date of Patent: May 8, 2012

(54) CELLULOSE ACYLATE FILM, PROCESS FOR PRODUCING THE SAME, AND POLARIZING PLATE AND LIQUID CRYSTAL DISPLAY DEVICE HAVING THE SAME

(75) Inventor: Eiichiro Aminaka, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 109 days.

(21) Appl. No.: 12/843,330

(22) Filed: Jul. 26, 2010

(65) Prior Publication Data

US 2011/0181812 A1    Jul. 28, 2011

(30) Foreign Application Priority Data

Jul. 29, 2009 (JP) ................................. 2009-176381

(51) Int. Cl.
*G02F 1/1335* (2006.01)

(52) U.S. Cl. ........ 349/118; 349/117; 349/119; 349/120; 349/121

(58) Field of Classification Search ........... 349/117–121
See application file for complete search history.

(56) References Cited

U.S. PATENT DOCUMENTS

| | | |
|---|---|---|
| 6,503,581 B1 | 1/2003 | Shibue et al. |
| 2006/0292315 A1 | 12/2006 | Inagaki et al. |
| 2007/0247576 A1 | 10/2007 | Tamagawa et al. |

FOREIGN PATENT DOCUMENTS

| | | |
|---|---|---|
| JP | 2007-3767 A | 1/2007 |
| WO | WO 2007/125764 A1 | 11/2007 |

*Primary Examiner* — Phu Vu

(74) *Attorney, Agent, or Firm* — Buchanan Ingersoll & Rooney PC

(57) ABSTRACT

Disclosed is a cellulose acylate film comprising a cellulose acylate satisfying relations of $2.0 \leq A+B \leq 2.45$, (II): and $0.8 \leq A \leq 1.4$, and (III): $0.6 \leq B \leq 1.65$ where "A" represents a degree of acetyl substitution of hydroxy in a glucose unit of cellulose acylate; and "B" represents a degree of with $C_3$ or longer acyl substitution of hydroxy in a glucose unit of cellulose acylate; and satisfying relations of $50 \text{ nm} \leq Re(590) \leq 70 \text{ nm}$, $100 \text{ nm} \leq Rth(590) \leq 120 \text{ nm}$, and (VI): $1.4 \leq Rth(590)/Re(590) \leq 2.6$.

20 Claims, 2 Drawing Sheets

Observer-Side

| TAC2 |
| Polarizer |
| TAC1 |

| VA mode Cell |

| TAC1 |
| Polarizer |
| TAC2 |

Backlight-Side

FIG. 1

CELLULOSE ACYLATE FILM, PROCESS FOR PRODUCING THE SAME, AND POLARIZING PLATE AND LIQUID CRYSTAL DISPLAY DEVICE HAVING THE SAME

CROSS-REFERENCE TO RELATED APPLICATIONS

The present application claims the benefit of priority from Japanese Patent Application No. 2009-176381, filed on Jul. 29, 2009, the contents of which are herein incorporated by reference in their entirety.

BACKGROUND OF THE INVENTION

1. Field of the Invention

The present invention relates to a cellulose acylate film, a process for producing it, and a polarizing plate and a liquid crystal display device having it.

2. Description of the Related Art

Liquid crystal display devices have been used for more and more various applications such as monitors of personal computers, mobile phones and televisions since they have various advantages such as small voltage and power consumption, and downsizing and thinning. Various modes of liquid crystal display devices depending on the state of liquid crystal molecules in the liquid crystal cell have been provided. Previously, a TN-mode employing a liquid crystal cell in which liquid crystal is twisted at about 90 degrees between the upper and lower substrates has been major. In general, a liquid crystal display device comprises a liquid crystal cell, an optically-compensatory film(s), and a polarizing element(s). The optically-compensatory film serves to cancel image coloration and to widen a viewing angle, including a stretched birefringent film and a film produced by coating a transparent film with a liquid crystal. For example, a technique of applying an optically-compensatory film prepared by applying a discotic liquid crystal to a triacetyl cellulose film and aligning and fixing it thereon, to a TN-mode liquid crystal cell to thereby widen a viewing angle has been proposed. However, for a liquid crystal display device for TVs that are expected to be watched at various angles on a large-size panel, the requirement in point of the viewing angle dependence thereof is severe, and still could not be on a satisfactory level even though the above-mentioned technique is applied thereto. Accordingly, others than TN-mode liquid crystal display devices, such as IPS (in-plane switching) mode, OCB (optically compensatory bend) mode and VA (vertically aligned) mode devices are now under investigations. In particular, VA-mode devices have a high contrast ratio and the production yield thereof is relatively high, and therefore they are now being in the mainstream of liquid crystal display devices for TV.

Cellulose acylate films exhibit high optical isotropy, that is, low retardation, compared with other polymer films. So, usually, they have been utilized in various applications such as protective films of polarizing plates, which are required to be optically isotropic.

U.S. Pat. No. 6,503,581B2 discloses a fatty acid cellulose ester film having an acetyl group and a propionyl group, wherein a sum of degree of acetyl substitution (DSac) and degree of propionyl substitution (DSpr) of the fatty acid cellulose ester of the fatty acid cellulose ester film is 2.8 or less, and a retardation value (Rt value) in the thickness direction is 60 to 300 nm; and also discloses, as an embodiment thereof, a fatty acid cellulose ester film having DSac of from 1.5 to 2.3, DSpr of from 0.5 to 1.2, and Re of equal to or smaller than 30 nm.

JP-A 2007-3767 discloses a polarizing plate having predetermined properties, and also discloses, as an embodiment thereof, a polarizing plate having a cellulose ester film, of which retardation in-plane is from 40 nm to 50 nm and retardation along the thickness direction is from 110 nm to 140 nm, containing cellulose acetate propionate having the total degree of substitution with acyl of from 2.10 to 2.65 and the degree of substitution with propionate of from 0.7 to 1.5.

WO2007/125764A1 discloses a retardation film containing a predetermined ester compound and a cellulose derivative; also discloses, as an embodiment thereof, a retardation film having retardation in plane, Ro, of from 20 nm to 80 nm, retardation along the thickness direction, Rth, of from 100 nm to 250 nm and the value of Rth/Ro of from 2.6 to 5.0; and also discloses, as an example of the cellulose derivative which can be used for preparing the film, cellulose acylate propionate.

Recently, more improvement in displaying-qualities has been required in terms of viewing-angle characteristics and coloration in the black state, and achieving these, more reducing the ratio, Rth/Re, of the cellulose acylate film to be used in a liquid crystal display device has been required.

SUMMARY OF THE INVENTION

One object of the invention is to provide a cellulose acylate film having high retardation in-plane and the low Rth/Re and to provide a process capable of producing the cellulose acylate film stably.

Another object of the invention is to provide a liquid crystal display device having wide viewing angle characteristics and being capable of displaying high contrast ratio images even in the oblique direction and to provide a polarizing plate to be used in the device.

As a result of earnest examination, the present inventors have found that using a cellulose acylate, as a material of a film, which has "A" and "B" ("A" is a degree substitution with acetyl and "B" is a degree of substitution with $C_3$ or longer acyl) fulfilling following relations $2.0 \leq A+B \leq 2.45$, $0.8 \leq A \leq 1.4$, and $0.6 \leq B \leq 1.65$ is effective.

Previously, increasing the degree of substitution with propionyl of a cellulose acylate having both of acetyl and propionyl has been considered unfavorable since it would widen the distances between the polymer chains in the aggregation state and weaken the interaction between the polymer chains, which leads to lower mechanical characteristics of the film. However, the present inventors' investigations have revealed that a film prepared by using such a cellulose acylate can be used as a retardation film or a protective film of a polarizing plate without any actual problems and that handling can be carried out in the production process without any actual problems due to significant progress in carrying techniques.

Usually, a cellulose acylate having a lower degree of acyl substitution shows higher intrinsic birefringence, and so it is possible to prepare a film having high retardation in plane by using a cellulose acylate having a low degree of acyl substitution. However, the present inventors' investigations have revealed that using some kinds of low-substituted cellulose acylates almost always increases not only Re but also Rth.

Therefore, even by using such a cellulose acylate, it may not be possible to prepare a film having sufficiently-decreased Rth/Re. As a result of further earnest examination, the present inventors have found that a cellulose acylate film having sufficiently-decreased Rth/Re can be prepared stably by using the cellulose acylate of which degrees of substitution with acetyl and with $C_3$ or longer acyl fulfill and by controlling the conditions in the production process, and made the present invention.

The means for achieving the above objects are as follows:

[1] A cellulose acylate film comprising a cellulose acylate satisfying relations (I)-(III):

$$2.0 \leq A+B \leq 2.45, \quad \text{(I)}$$

$$0.8 \leq A \leq 1.4, \text{ and} \quad \text{(II)}$$

$$0.6 \leq B \leq 1.65 \quad \text{(III)}$$

where "A" represents a degree of acetyl substitution of hydroxy in a glucose unit of cellulose acylate; and "B" represents a degree of $C_3$ or longer acyl substitution of hydroxy in a glucose unit of cellulose acylate; and satisfying relations (IV)-(VI):

$$50 \text{ nm} \leq Re(590) \leq 70 \text{ nm}, \quad \text{(IV)}$$

$$100 \text{ nm} \leq Rth(590) \leq 120 \text{ nm, and} \quad \text{(V)}$$

$$1.4 \leq Rth(590)/Re(590) \leq 2.6 \quad \text{(VI)}$$

where, in relations (IV) and (VI), Re(λ) indicates retardation (unit: nm) in-plane for an incident light having a wavelength of λ nm at 25 degrees Celsius and at 60% RH; and in relations (V) and (VI), Rth(λ) indicates retardation (unit: nm) along the thickness direction for an incident light having a wavelength of λ nm at 25 degrees Celsius and 60% RH.

[2] The cellulose acylate of [1], which satisfies relations (VII) and (VIII):

$$0 \text{ nm} \leq Re(630) - Re(450) \leq 10 \text{ nm, and} \quad \text{(VII)}$$

$$0 \text{ nm} \leq Rth(630) - Rth(450) \leq 15 \text{ nm.} \quad \text{(VIII)}$$

[3] The cellulose acylate film of claim 1 which satisfies relations (IVb)-(VIb)

$$60 \text{ nm} \leq Re(590) \leq 70 \text{ nm}, \quad \text{(IVb)}$$

$$100 \text{ nm} \leq Rth(590) \leq 110 \text{ nm, and} \quad \text{(Vb)}$$

$$1.4 \leq Rth(590)/Re(590) \leq 2.0. \quad \text{(VIb)}$$

[4] The cellulose acylate of any one of [1]-[3], wherein the cellulose acylate satisfies $0.65 \leq B \leq 1.55$.

[5] A method for producing a cellulose acylate film of any one of [1]-[4], comprising in the following order:

casting a solution prepared by dissolving a cellulose acylate satisfying relations (I)-(III):

$$2.0 \leq A+B \leq 2.45, \quad \text{(I)}$$

$$0.8 \leq A \leq 1.4, \text{ and} \quad \text{(II)}$$

$$0.6 \leq B \leq 1.65 \quad \text{(III)}$$

where "A" represents a degree of acetyl substitution of hydroxy in a glucose unit of cellulose acylate; and "B" represents a degree of $C_3$ or longer acyl substitution of hydroxy in a glucose unit of cellulose acylate; in a solvent on a support;

drying the cast solution on the support to form a web; and peeling the web having a residual solvent amount of from 10 to 75% by mass from the support.

[6] The method of [5], wherein an averaged drying rate for just a minute after the time casting the solution on the support is from 6 to 20 mass %/sec.

[7] The method of [5] or [6], wherein an averaged drying rate for just 30 seconds after the time casting the solution on the support is from 8 to 30 mass %/sec.

[8] The method of any one of [5]-[7], It comprises drying the cast solution on the support within a minute after casting the solution on the support by providing the cast solution with blowing gas having a temperature of 50 degrees Celsius to 150 degrees Celsius and a wind speed of 3 to 15 m/sec.

[9] A polarizing plate comprising a cellulose acylate film of any one of [1]-[4].

[10] A liquid crystal display device comprising a polarizing plate of [9].

[11] The liquid crystal display device of [10], comprising a VA-mode liquid crystal cell.

BRIEF DESCRIPTION OF THE DRAWINGS

FIG. 1 is a cross-section diagram showing an exemplary embodiment of the liquid crystal display of the invention.

DETAILED DESCRIPTION OF THE INVENTION

Figure 2A:
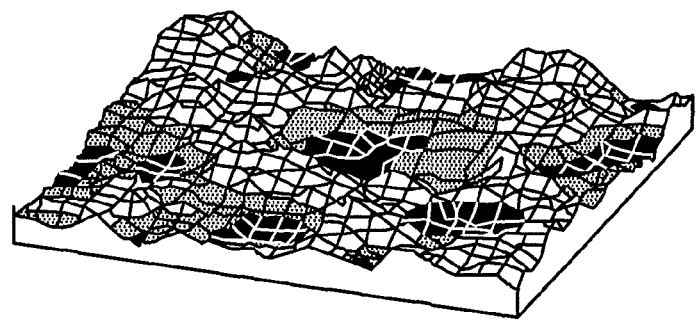
FIGS. 2A to 2C are schematic diagrams showing a method of measuring inclined angles of a film according to an exemplary embodiment of the invention.

Paragraphs below will detail the present invention. The explanation below may be made based on representative embodiments of the present invention, without limiting the present invention. Any numerical range expressed using "to" in this patent specification means a range including the preceding and succeeding numerical values as the lower limit and the upper limit, respectively.

1. Cellulose Acylate Film

1.-1 Cellulose Acylate

The cellulose acylate film of the present invention contains at least a cellulose acylate satisfying following relations (I)-(III). The cellulose acylate film of the present invention may contain one kind of the cellulose acylate satisfying relations (I)-(III) or tow or more kinds of the cellulose acylates satisfying following relations (I)-(III).

$$2.0 \leq A+B \leq 2.45 \quad \text{(I)}$$

$$0.8 \leq A \leq 1.4 \quad \text{(II)}$$

$$0.6 \leq B \leq 1.65 \quad \text{(III)}$$

In formulas (I)-(III), "A" is a degree of acetyl substitution of hydroxy in a glucose unit of a cellulose acylate with acetyl; and "B" is a degree of $C_3$ or longer acyl substitution of hydroxy in a glucose unit of a cellulose acylate. The cellulose acylate is an ester of cellulose with mixed aliphatic acids obtained by replacing hydroxy of cellulose with acetyl and $C_3$ or longer acyl.

β-1,4 bonding glucose units constituting cellulose have free hydroxyl groups at the 2-, 3-, and 6-positions. The cellulose acylate is a polymer formed by esterifying a part or the whole of these hydroxyl groups with an acyl group. The degree of acyl substitution means the proportion of esterified groups at each of the 2-, 3-, and 6-positions of the cellulose (100% esterification is a degree of substitution of 1).

A preferable example of the cellulose acylate to be used in the present invention satisfies following relations (Ia)-(IIIa).

$$2.0 \leq A+B \leq 2.35 \quad \text{(Ia)}$$

$$0.8 \leq A \leq 1.3 \quad \text{(IIa)}$$

$$0.6 \leq B \leq 1.55 \quad \text{(IIIa)}$$

Another preferable example of the cellulose acylate to be used in the present invention satisfies following relations (Ib)-(IIIb).

$$2.0 \leq A+B \leq 2.25 \quad \text{(Ib)}$$

$$0.8 \leq A \leq 1.2 \quad \text{(IIb)}$$

$$0.6 \leq B \leq 1.45 \quad \text{(IIIb)}$$

A cellulose acylate having the value of "A+B" of smaller than 2.0 is highly hydrophilic; and therefore the film prepared by using such a cellulose acylate is easily influenced by the environmental humidity, which is not preferable practically. On the other hand, the film prepared by using a cellulose acylate having the value of "A+B" of higher than 2.45 can only develop optical properties varying between any narrow range, which may make achieving high Re difficult. Furthermore, a cellulose acylate having "B" of smaller than 0.6 is similar to a cellulose acetate; and the optical properties of the film prepared by using such a cellulose acylate are easily influenced by the environmental humidity, which is not preferable practically. On the other hand, the film prepared by using a cellulose acylate having "B" of more than 1.65 shows large thermal properties such as coefficient of thermal expansion, which is not preferable practically. The films prepared by using the cellulose acylate satisfying the above relations (I)-(III) are free from such disadvantages, and furthermore, exhibit high Re and low Rth. Among these, cellulose acylates having the value of "A+B" of from 2.0 to 2.4 are preferable. And cellulose acylates having "B" of from 0.65 to 1.55 are preferable.

The cellulose acylate to be used in the present invention has $C_3$ or longer acyl; and it is preferable that 28% or more thereof exists as a substitution of the 6-position hydroxy; it is more preferable that 30% or more thereof exists as a substitution of the 6-position hydroxy; and it is even more preferable that 32% or more thereof exists as a substitution of the 6-position hydroxy.

Regarding the cellulose acylate to be used in the present invention, the total degree of substitution of the 6-position hydroxy with acetyl and $C_3$ or longer acyl is preferably equal to or more than 0.75, more preferably equal to or more than 0.80, and even more preferably equal to or more than 0.80. The cellulose acylate satisfying the above conditions exhibits good solubility in not only chlorine-based organic solvent but also non-chlorine-based organic solvent; and the solution thereof has low viscosity and is easily subjected to filtration, which may make preparing a dope to be used in a solvent casting method easy.

Each of the degrees of substitution can be determined by $^{13}$C-NMR according to the method described in Carbohydr. Res., 273 (1995), 83-91 (Tezuka, et al), which measures the substitution states of acetyl, propionyl or butyryl to the 2, 3- and 6-positions.

Examples of the $C_3$ or longer acyl include both of aliphatic acyls and aromatic acyls. The examples include alkyl carbonyls, alkenyl carbonyls, aromatic carbonyls and aromatic alkylcarbonyls, which may have one or more substituent respectively. Preferable examples of the $C_3$ or longer acyl include, but are not limited to, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexane carbonyl, oleoyl, benzoyl, naphthyl carbonyl, and cinnamoyl. Among these, propionyl, butanoyl, dodecanoyl, octadecanoyl, t-butanoyl, oleoyl, benzoyl, naphthyl carbonyl, and cinnamoyl are more preferable. Propionyl and butanoyl are especially preferable.

One preferable example of the cellulose acylate to be used in the present invention is a cellulose acetate propionate having acetyl and propionyl and the degree of propionyl substitution, "B", thereof is from 0.6 to 1.65 (preferably from 0.6 to 1.55, and more preferably from 0.6 to 1.45).

Examples of the cellulose acylate which can be used in the present invention include cellulose acetate propionate and cellulose acetate butyrate satisfying the above relations (I)-(III).

It is preferable that the ingredient constituting the cellulose acylate film of the present invention is the above cellulose acylate essentially. The term of "essentially" means 55% by mass or more (preferably 70% by mass or more, and even more preferably 80% by mass or more) of the polymer ingredients contained in the film.

Regarding a method for synthesizing cellulose acylate, its basic principle is described in *Wood Chemistry* by Nobuhiko Migita et al., pp. 180-190 (Kyoritsu Publishing, 1968). One typical method for synthesizing cellulose acylate is a liquid-phase acylation method with carboxylic acid anhydride-carboxylic acid-sulfuric acid catalyst. Concretely, a starting material for cellulose such as cotton linter or woody pulp is pretreated with a suitable amount of a carboxylic acid such as acetic acid, and then put into a previously-cooled acylation mixture for esterification to synthesize a complete cellulose acylate (in which the overall substitution degree of acyl group in the 2-, 3- and 6-positions is nearly 3.00). The acylation mixture generally includes a carboxylic acid serving as a solvent, a carboxylic acid anhydride serving as an esterifying agent, and sulfuric acid serving as a catalyst. In general, the amount of the carboxylic acid anhydride to be used in the process is stoichiometrically excessive over the overall amount of water existing in the cellulose that reacts with the carboxylic acid anhydride and that in the system. Next, after the acylation, the excessive carboxylic acid anhydride still remaining in the system is hydrolyzed, for which, water or water-containing acetic acid is added to the system. Then, for partially neutralizing the esterification catalyst, an aqueous solution that contains a neutralizing agent (e.g., carbonate, acetate, hydroxide or oxide of calcium, magnesium, iron, aluminum or zinc) may be added thereto. Then, the resulting complete cellulose acylate is saponified and ripened by keeping it at 50 to 90° C. in the presence of a small amount of an acylation catalyst (generally, sulfuric acid remaining in the system), thereby converting it into a cellulose acylate having a desired substitution degree of acyl group and a desired polymerization degree. At the time when the desired cellulose acylate is obtained, the catalyst still remaining in the system is completely neutralized with the above-mentioned neutralizing agent; or the catalyst therein is not neutralized, and the cellulose acylate solution is put into water or diluted sulfuric acid (or water or diluted sulfuric acid is put into the cellulose acylate solution) to thereby separate the cellulose acylate, and thereafter this is washed and stabilized to obtain the intended product, cellulose acylate.

Any cellulose acylates prepared according to any method may be used in the present invention.

Preferably, the polymerization degree of the cellulose acylate is 200 to 700 as the viscosity-average polymerization degree thereof, more preferably 250 to 550, even more preferably 250 to 400, and especially preferably 250-350. The viscosity-average polymerization degree may be measured according to a description of limiting viscosity method by Uda et al. (Kazuo Uda, Hideo Saito; *Journal of the Fiber Society of Japan*, vol. 18, No. 1, pp. 105-120, 1962). The method for measuring the viscosity-average polymerization degree is described also in JP-A-9-95538.

Cellulose acylate where the amount of low-molecular components is small may have a high mean molecular weight (polymerization degree), but its viscosity may be lower than that of ordinary cellulose acylate. Such cellulose acylate where the amount of low-molecular components is small may be obtained by removing low-molecular components from cellulose acylate synthesized in an ordinary method. The removal of low-molecular components may be attained by washing cellulose acylate with a suitable organic solvent. Cellulose acylate where the amount of low-molecular components is small may be obtained by synthesizing it. In case where cellulose acylate where the amount of low-molecular components is small is synthesized, it is desirable that the amount of the sulfuric acid catalyst in acylation is controlled to be 0.5 to 25 parts by mass relative to 100 parts by mass of cellulose. When the amount of the sulfuric acid catalyst is controlled to fall within the range, then cellulose acylate having a preferable molecular weight distribution (uniform molecular weight distribution) can be synthesized. The polymerization degree and the distribution of the molecular weight of the cellulose acylate can be measured by the gel penetration chromatography (GPC), etc.

The cellulose acylate to be used as the starting material in producing the cellulose acylate film may be a powdery or granular one. 90% by mass or more of cellulose acylate particles to be used preferably has a mean particle size of 0.5 to 5 mm; and 50% by mass or more of cellulose acylate particles to be used preferably has a mean particle size of 1 to 4 mm. Regarding the shape of cellulose acylate particles, more spherical shape is more preferable.

The water content of the cellulose acylate to be used as the starting material is preferably equal to or less than 2.0% by mass, more preferably equal to or less than 1% by mass, and even more preferably equal to or less than 0.7% by mass. Usually, a cellulose acylate contains water and the water content thereof is usually from 2.5 to 5% by mass. Therefore, preferably, after being subjected to a drying treatment for reducing the water content within the above range, the cellulose acylate is used as a starting material of the film. The drying treatment may be carried out according to any method so long as the water content can be reduced within the preferable range. The details of the row cotton materials and the synthetic methods are described in Hatsumei Kyokai Disclosure Bulletin (No. 2001-1745, published by the Hatsumei Kyokai on Mar. 15, 2001), p. 7-12, and may be suitably applied to the invention.

1.-2 Properties of Cellulose Acylate Film

In this description, $Re(\lambda)$ and $Rth(\lambda)$ are retardation in plane (nm) and retardation along the thickness direction (nm), respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments).

When a film to be analyze by a monoaxial or biaxial index ellipsoid, $Rth(\lambda)$ of the film is calculated as follows.

$Rth(\lambda)$ is calculated by KOBRA 21ADH or WR based on six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to the following formulae (21) and (22):

$$Re(\theta) = \left[ nx - \frac{(ny \times nz)}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (21)$$

$$Rth = \left[\frac{nx+ny}{2} - nz\right] \times d \quad (22)$$

wherein $Re(\theta)$ represents a retardation value in the direction inclined by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the film to be analyzed is not expressed by a monoaxial or biaxial index ellipsoid, or that is, when the film does not have an optical axis, then $Rth(\lambda)$ of the film may be calculated as follows. The selectivity of the measurement wavelength $\lambda$ nm may be conducted by a manual exchange of a wavelength-filter, a program conversion of a measurement wavelength value or the like.

$Re(\lambda)$ of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of $\lambda$ nm applied in the inclined direction; and based on the thus-measured retardation values, the estimated value of the mean refractive index and the inputted film thickness value, $Rth(\lambda)$ of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, Nz=(nx−nz)/(nx−ny) is further calculated.

In this description, unless otherwise specifically indicated, Re, Rth and the refractive index are those measured at λ=590 nm. And unless there is any indication about the environmental conditions in measuring, the values are measured under the environmental conditions at a temperature of 25 degrees Celsius and at 60% RH.

The cellulose acylate film of the present invention satisfies following relations (IV)-(VI).

$$50 \text{ nm} \leq Re(590) \leq 70 \text{ nm} \quad \text{(IV)}$$

$$100 \text{ nm} \leq Rth(590) \leq 120 \text{ nm} \quad \text{(V)}$$

$$1.4 \leq Rth(590)/Re(590) \leq 2.6 \quad \text{(VI)}$$

The cellulose acylate film satisfying the relations can contribute to improvement in the viewing angle characteristics and the contrast ratio when being used in a VA-mode liquid crystal display device, and is preferable.

Preferably, the cellulose acylate film of the invention satisfies following relations (IVa)-(VIa).

$$55 \text{ nm} \leq Re(590) \leq 70 \text{ nm} \quad \text{(IVa)}$$

$$100 \text{ nm} \leq Rth(590) \leq 115 \text{ nm} \quad \text{(Va)}$$

$$1.4 \leq Rth(590)/Re(590) \leq 2.3 \quad \text{(VIa)}$$

More preferably, the cellulose acylate film of the invention satisfies following relations (IVb)-(VIb).

$$60 \text{ nm} \leq Re(590) \leq 70 \text{ nm} \quad \text{(IVb)}$$

$$100 \text{ nm} \leq Rth(590) \leq 110 \text{ nm} \quad \text{(Vb)}$$

$$1.4 \leq Rth(590)/Re(590) \leq 2.0 \quad \text{(VIb)}$$

Furthermore, it is also preferable that Re(λ) and Rth(λ) of the cellulose acylate film of the invention, which are measured for an incident light having a wavelength of λ nm at 25 degrees Celsius and at 60% RH, satisfy following relations (VII) and (VIII).

$$0 \text{ nm} \leq Re(630) - Re(450) \leq 10 \text{ nm} \quad \text{(VII)}$$

$$0 \text{ nm} \leq Rth(630) - Rth(450) \leq 15 \text{ nm} \quad \text{(VIII)}$$

More preferably, they satisfy following relations (VIIa) and (VIIIa).

$$2 \text{ nm} \leq Re(630) - Re(450) \leq 10 \text{ nm} \quad \text{(VIIa)}$$

$$4 \text{ nm} \leq Rth(630) - Rth(450) \leq 15 \text{ nm} \quad \text{(VIIIa)}$$

One feature of the cellulose acylate film of the invention resides in that variation of retardation in plane and retardation along the thickness direction depending on the humidity is reduced by containing the cellulose acylate satisfying the above relations (I)-(III). In particular, according to the invention, ΔRe(=|Re10% RH−Re80% RH|), which is a difference between the Re value at 25 degrees Celsius and at 10% RH and the Re value at 25 degrees Celsius and at 80% RH, of 0 to 15 nm can be achieved. Preferably, ΔRe is from 0 to 12 nm, and more preferably from 0 to 9 nm. And ΔRth (=|Rth10% RH−Rthe80% RH|), which is a difference between the Rth value at 25 degrees Celsius and at 10% RH and the Rth value at 25 degrees Celsius and at 80% RH, of 0 to 20 nm can be achieved. Preferably, ΔRth is from 0 to 15 nm, and more preferably from 0 to 10 nm.

Preferably, the standard deviation of variation in the slow axis direction of the cellulose acylate film of the present invention is equal to or smaller than 1.0 degree, and the PV value of the film thickness is equal to or smaller than 1.0 μm.

The variation in the slow axis direction can be measured by using an automatic birefringence-measuring instrument ("AD-200" manufactured by ETO co., Ltd.) The averaged value of the slow axis direction can be calculated by measuring it at each of 13 points equally spaced along the width direction through the overall width. The variation in the slow axis direction is a difference between the maximum and minimum values among the values of 13 points equally spaced along the width direction through the overall width.

The variation in the slow axis direction can be calculated as follows. The variation in the slow axis direction is calculated at 1 m intervals in the long direction, the averaged value of the variation in the slow axis direction of 100 points (100 m)

$\overline{x}$ is calculated according to the following formula.

$$\overline{x} = \frac{1}{n}\sum_{i=1}^{n} x_i$$

In the formula, xi indicates each variation in the slow axis direction; and n is 100. The variance, σ, is calculated according to the following formula $$\sigma^2 = \frac{1}{n}\sum_{i=1}^{n}(x_i - \overline{x})^2$$

and the square root thereof is the standard deviation, that is, the standard deviation of the variation in the slow axis direction.

The standard derivation of the variation in the slow axis direction is preferably from 0 to 0.5, more preferably from 0 to 0.45 and even more preferably from 0 to 0.4.

By adjusting the standard derivation of the variation in the slow axis direction to the above range, the uniformity along both of the width and long directions may be excellent and the slow axis directions in the rolled-up long film may be aligned in the same direction as a whole.

The slow axis is calculated by using the retardation value of a sample film, having a dimension of 70 mm×100 mm, for a light coming along the normal line of the film surface measured by an automatic birefringence-measuring instrument (KOBRA21DH manufactured by Oji Scientific Instruments).

According to the invention, the PV value (maximum height-difference) of the film thickness can be measured by FUJINON-streak analysis instrument (FX-03). The diameter φ of the measured area may be adjusted to 60 mm.

The PV value measured according to the above method is preferably equal to or smaller than 0.6 μm, more preferably equal to or smaller than 0.8 μm, much more preferably equal to or smaller than 0.55 μm, and even much more preferably equal to or smaller than 0.5 μm.

By adjusting the PV value to the above range, the unevenness of the film thickness can be reduced, which is preferable in terms of planarity.

Haze:

The haze value of the cellulose acylate film of the invention is preferably from 0.01% to 2.0%, more preferably from 0.05% to 1.5% and even more preferably from 0.1% to 1.0%.

When the film having the haze value of more than 2% is used in a panel, the light leakage may be increased, which is not preferable.

In the description, the method for measuring haze of a film is as follows. A film sample, 40 mm×80 mm, is prepared, and haze of the sample is measured using a haze-meter (HGM-2DP, Suga Test Instruments Co., Ltd.) under a condition of 25 degrees Celsius and 60% RH according to JIS K-6714.

1.-3 Additives

At least one additive may be added to the cellulose acylate film of the present invention for developing any desired properties. Examples of the additive which can be used include plasticizers, UV absorbents, degradation inhibitors, Re enhancers, Rth reducers, fine particles, promoters for peeling, IR absorbents, and agents for inhibiting variation in Re or Rth depending on humidity. The additive(s) to be used in the present invention may be selected from any solid materials or any oily materials. Their melting points or boiling points are not limited. They are described in, for example, JP-A 2001-151901.

Compounds Having Furanose or Pyranose Structure:

At least one compound having furanose or pyranose structure is preferably added to the cellulose acylate film of the present invention for reducing the dependency of Re or Rth on the humidity.

Examples of the compound having furanose or pyranose structure include any ester compounds obtained by esterification of all or a part of hydroxyls in compound (A) having one furanose or pyranose ring or in compound (B) having 2 to 12 furanose or pyranose rings. Hereinafter, these compounds are occasionally referred to as "sugar ester compound".

Examples of compound (A) include, but are not limited to, glucose, galactose, mannose, fructose, xylose and arabinose.

Examples of compound (B) include lactose, sucrose, nystose, 1F-fructosylnystose, stachyose, maltitol, lactitol, lactulose, cellobiose, maltose, cellotriose, maltotriose, raffinose and kestose. Examples of compound (B) include, but are not limited to, gentiobiose, gentiotriose, gentiotetraose, xylotriose, galactosylsucrose and stachyose.

Among the examples of compounds (A) and (B), compounds having both of furanose and pyranose structures are preferable. Examples of such a compound include sucrose, ketose, nytose, 1F-fructosylnystose and stachyose; and sucrose is more preferable. Other preferable examples of compounds (A) and (B) include compounds having two or three of at least one of furanose and pyranose structures.

Examples of the monocarboxylic acid which can be used for esterification of all of or a part of hydroxyls in compound (A) or (B) include, but are not limited to, aliphatic monocarboxylic acids, alicyclic monocarboxylic acids and aromatic monocarboxylic acids. Monocarboxylic acid may be used singly or in combination with one or more other monocarboxylic acid.

Preferable examples of the aliphatic monocarboxylic acid include saturated aliphatic acids such as acetic acid, propionic acid, butyric acid, isobutyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotinic acid, heptacosanoic acid, montanic acid, melissic acid and lacceric acid; unsaturated aliphatic acids such as undecylenic acid, oleic acid, sorbic acid, linoleic acid, linolenic acid, arachidonic acid and octenic acid.

Preferable examples of the alicyclic monocarboxylic acid include cyclopentane carboxylic acid, cyclohexane carboxylic acid, cyclooctane carboxylic acid and derivatives thereof.

Preferable examples of the aromatic monocarboxylic acid include single-ring aromatic monocarboxylic acids such as benzoic acid, toluic acid and other benzoic acid derivatives, obtained by introducing alkyl or alkoxy to a benzene ring of benzoic acid; cinnamic acid; plural-rings aromatic monocarboxylic acids such as benzilic acid, biphenyl carboxylic acid, naphthalene carboxylic acid, tetralin carboxylic acid; and derivatives thereof. More specifically, examples of the carboxylic acid include xylic acid, hemellitic acid, mesitylenic acid, prehnitylic acid, γ-isodurylic acid, durylic acid, mesitoic acid, α-isodurylic, cumic acid, α-toluic acid, hydratropic acid, atropic acid, hydrocinnamic acid, salicylic acid, o-anisic acid, m-anisic acid, p-anisic acid, creosote acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, homovanillic acid, homoveratric acid, o-homoveratric acid, phthalonic acid, and p-coumalic acid; and benzoic acid is especially preferable.

Among the ester compounds obtained by esterification of compound (A) or (B), acetyl compounds obtained by introduction of acetyl are preferable.

Examples of the method of preparing the acetyl compounds include those described in JP-A 8-245678.

Examples of the compound having 3 to 12 furanose or pyranose rings include oligosaccharide esters Oligosaccharide may be prepared from starch or sucrose through the use of enzyme such as amylase; and examples of oligosaccharide include maltooligosaccharide, isomaltooligosaccharide, fructo-oligosaccharide, galacto-oligosaccharide and xylo-oligosaccharide.

Oligosaccharide may be subjected to acetylation according to the method same as that for acetylation of compound (A) or (B).

One example of the method for preparing the ester compound is as follows.

Acetic acid anhydride (200 ml) was added dropwise to a solution prepared by mixing glucose (29.8 g, 166 mmol) and pyridine (100 ml) and was reacted for 24 hours. After that, the solution was evaporated to be condensed and then was poured into iced water. After being left for an hour, the solution was filtrated through a glass filter to be divided into solid and liquid; and then, the solid on the glass filter was dissolved in chloroform and the solution was subjected to separation with cold water plural times till the solution neutralized. Removed the organic layer, the solution was dried by anhydrous sodium sulfate. After removal of anhydrous sodium sulfate, the solution was evaporated, so that chloroform was removed. And then the solution was dried under reduced pressure to give glucose pentaacetate (58.8 g, 150 mmol, 90.9%). Any monocarboxylicacid mentioned above can be used in place of acetic acid anhydride.

Examples of the compound having furanose or pyranose structure include, but are not limited to, those described below.

Compound 1
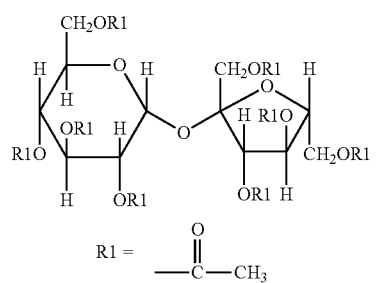
Compound 2
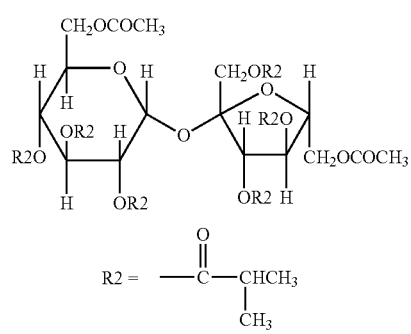
Compound 3
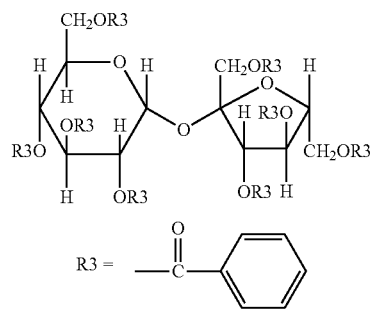
Compound 4
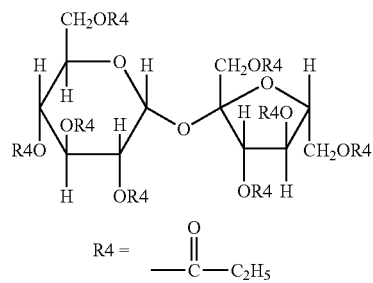
Compound 5
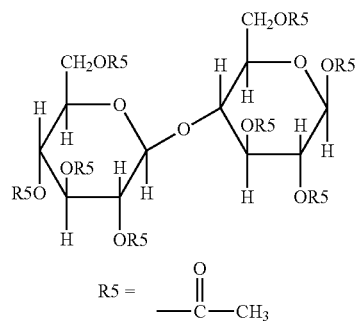
Compound 6
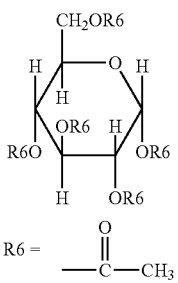
Compound 7
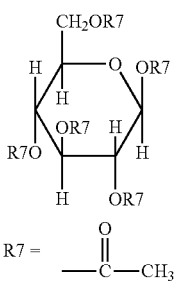
Compound 8
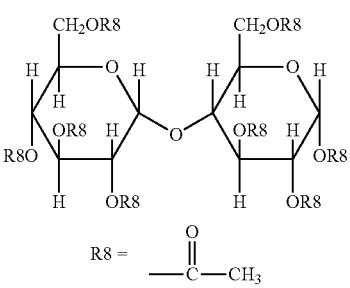
Compound 9
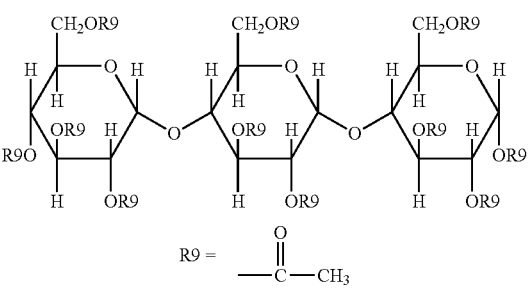
Compound 10
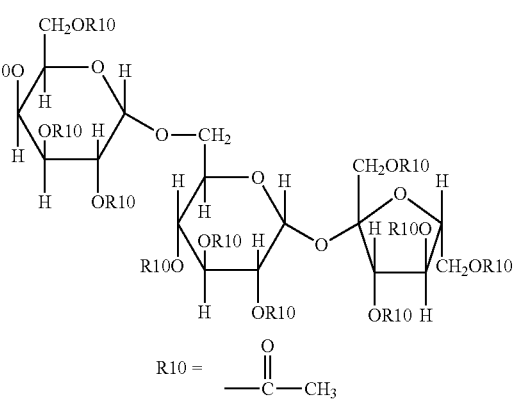

Compound 11
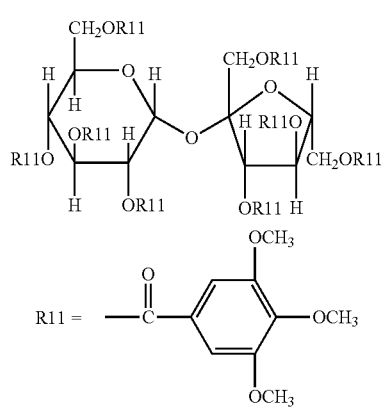
Compound 12
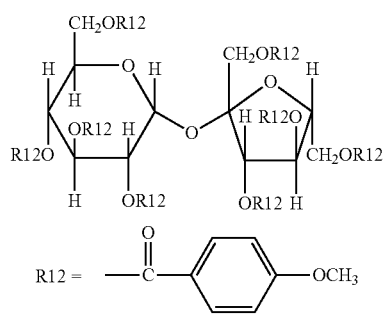
Compound 13
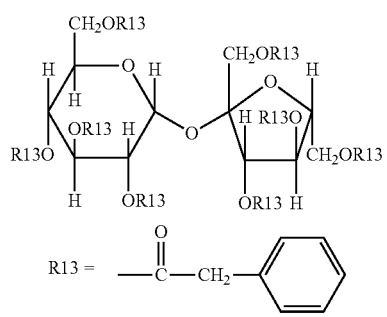
Compound 14
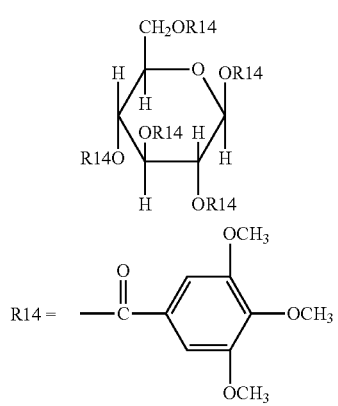
Compound 15
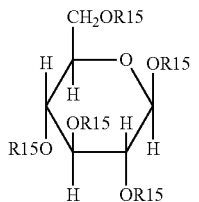
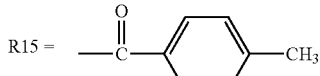
Compound 16
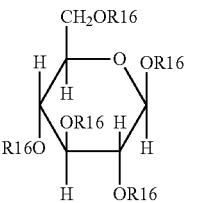
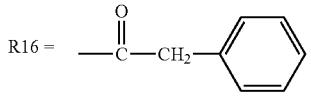
Compound 17
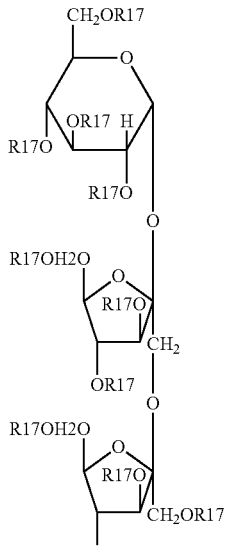
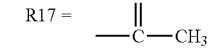
Compound 18
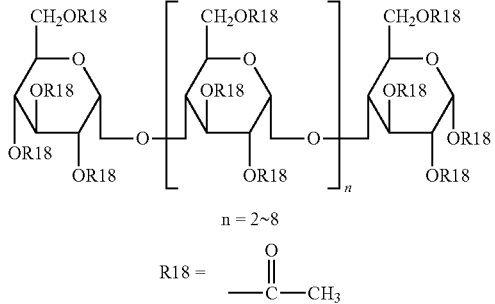

Compound 19

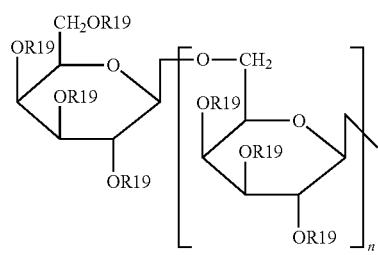

n = 1~8

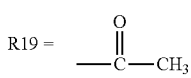

Compound 20

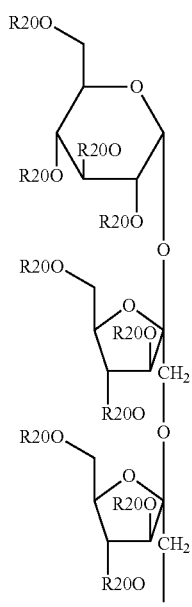

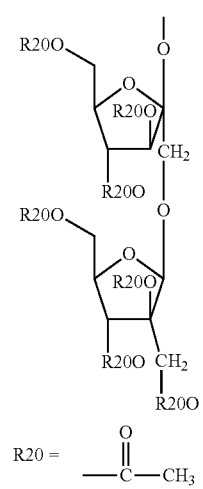

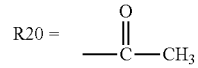

Compound 21

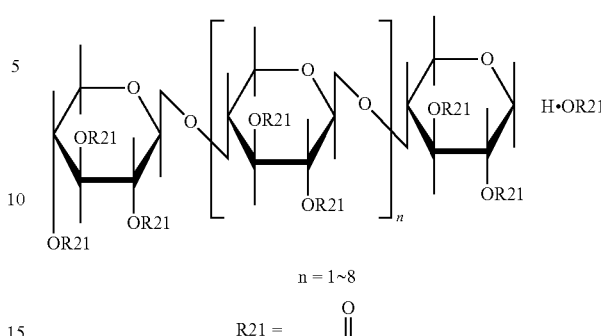

n = 1~8

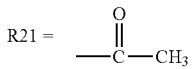

Compound 22

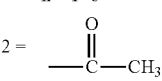

In terms of inhibition of variation in retardation depending on the humidity or in terms of stability of displaying-quality, the cellulose acylate film of the invention preferably contains the sugar ester(s) in the amount of from 1 to 30% by mass, and more preferably from 5 to 30% by mass. By adjusting the amount of the sugar ester(s) to the above range, the film may be free from bleed out, which is preferable.

Plasticizer:

The cellulose acylate film may contain at least one plasticizer together with or in place of the sugar ester. Examples of the plasticizer which can be used in the present invention include phosphate-type plasticizers, phthalate-type plasticizers, trimellitic acid ester-type plasticizers, pyromellitic acid-type plasticizers, polyalcohol-type plasticizers, glycolate-type plasticizers, citrate ester-type plasticizers, fatty acid ester-type plasticizers, carboxylate-type plasticizers and polyester-type plasticizers. Polyalcohol-type plasticizers, carboxylate-type plasticizers and ester-type plasticizers are especially preferable. Preferable examples of the ester-type plasticizers include esters, which are formed of aliphatic polyalcohol and monocarboxylic acid, having aromatic ring(s) and cycloalkyl ring(s) in the molecule.

Especially, aliphatic ester-type plasticizers, formed of aliphatic polyalcohol and aliphatic polycarboxylic acid, are preferable because of their abilities of reducing Rth.

Examples of the polyalcohol include the compounds represented by formula (2).

In the formula, $R^1$ represents an n-valent organic group; and n represents positive integer equal to or more than 2.

Preferable examples of the polyalcohol include, but are not limited to, adonitol, arabitol, ethylene glycol, diethylene glycol, triethylene glycol, tetraethylene glycol, 1,2-propanedio, 1,3-propanedio, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol. Especially, triethylene glycol, tetraethylene glycol, dipropylene glycol, tripropylene glycol, sorbitol, trimethylolpropane and xylitol are preferable.

The monocarboxylic acid to be used for preparing the polyalcohol esters is not limited, and may be selected from any aliphatic monocarboxylic acids, alicyclic monocarboxylic acids and aromatic monocarboxylic acids. Among these, aliphatic monocarboxylic acids and aromatic carboxylic acids are preferable in terms of moisture permeability and retention ability.

Preferable examples of the monocarboxylic acid include, but are not limited to, those described below.

Preferable examples of the aliphatic monocarboxylic acid include $C_{1-32}$ linear or branched fatty acids. $C_{1-20}$ linear or branched fatty acids are more preferable, and $C_{1-10}$ linear or branched fatty acids are much more preferable. Mixing acetic acid is preferable since the compatibility with cellulose acylate may be improved. And mixtures of acetic acid and other monocarboxylic acid(s) are preferable.

Preferable examples of the aliphatic monocarboxylic acid include saturated aliphatic acids such as acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid; and unsaturated aliphatic acids such as undecylenic acid, oleic acid, sorbic acid, linoleic acid, linolenic acid and arachidonic acid.

Preferable examples of the alicyclic monocarboxylic acid include cyclopentane carboxylic acid, cyclohexane carboxylic acid, cyclooctane carboxylic acid and derivatives thereof.

Preferable examples of the aromatic monocarboxylic acid include single-ring aromatic monocarboxylic acids such as benzoic acid, toluic acid and other benzoic acid derivatives, obtained by introducing alkyl or alkoxy to a benzene ring of benzoic acid; plural-rings aromatic monocarboxylic acids such as biphenyl carboxylic acid, naphthalene carboxylic acid, tetralin carboxylic acid; and derivatives thereof. More specifically, examples of the carboxylic acid include xylic acid, hemellitic acid, mesitylenic acid, prehnitylic acid, γ-isodurylic acid, durylic acid, mesitoic acid, α-isodurylic, cumic acid, α-toluic acid, hydratropic acid, atropic acid, hydrocinnamic acid, salicylic acid, o-anisic acid, m-anisic acid, p-anisic acid, creosote acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, homovanillic acid, homoveratric acid, o-homoveratric acid, phthalonic acid, and p-coumalic acid; and benzoic acid is especially preferable.

The molecular weight of the polyalcohol ester is not limited, and preferably, from 300 to 1550, and more preferably, from 350 to 750. In terms of difficulty of evaporation, the polyalcohol ester having a greater molecular weight is more preferable; on the other hand, in terms of moisture permeability and compatibility with cellulose acylate, the polyalcohol ester having a smaller molecular weight is more preferable.

The carboxylic acid to be used for preparing the polyalcohol ester may be used singly or in combination with other carboxylic acid. All of hydroxyls in the polyalcohol may be esterified; or a part of hydroxyls in the polyalcohol may be esterified.

Examples of the polyalcohol ester include those, but are not limited to, those described below.

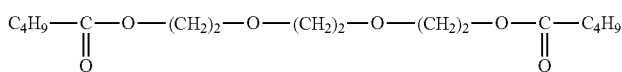

1

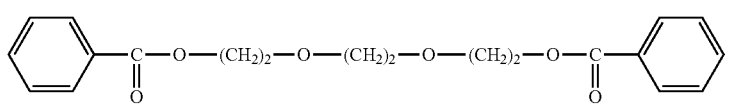

2

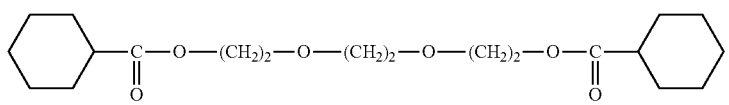

3

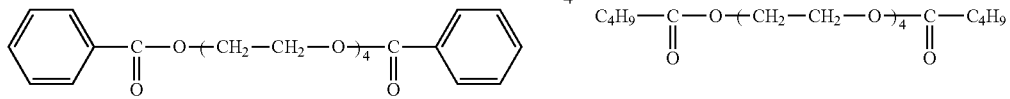

4    5

-continued
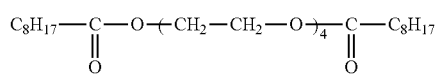 6
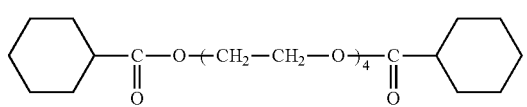 7
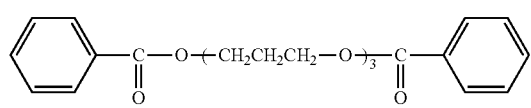 8
 9
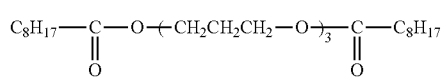 10
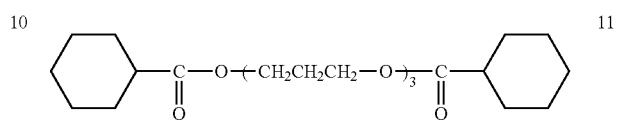 11
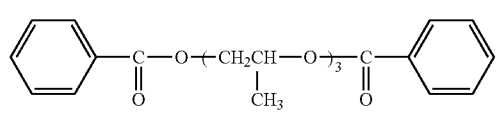 12
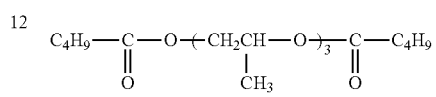 13
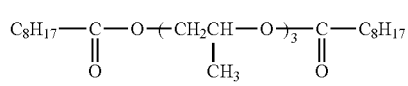 14
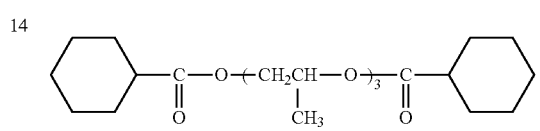 15
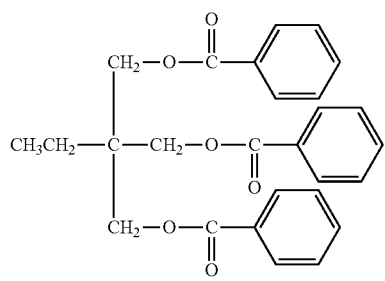 16
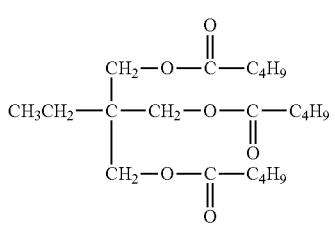 17
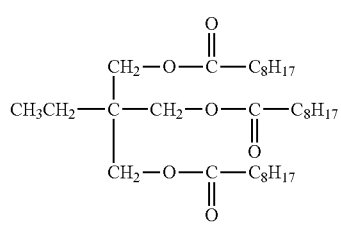 18
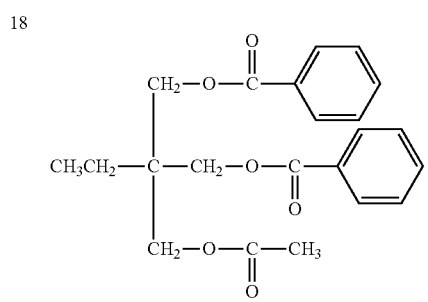 19
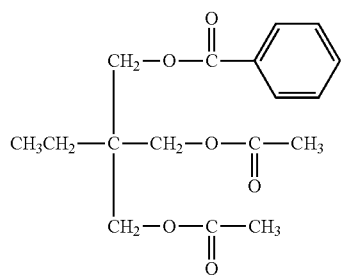 20
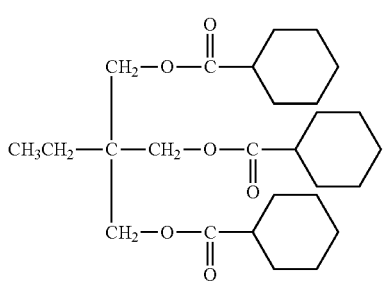 21

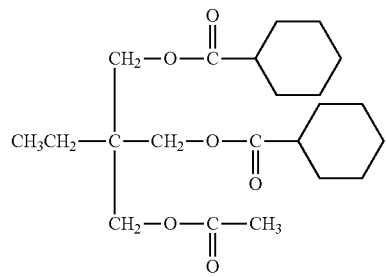
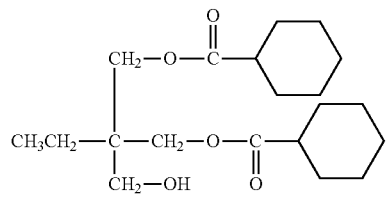
22
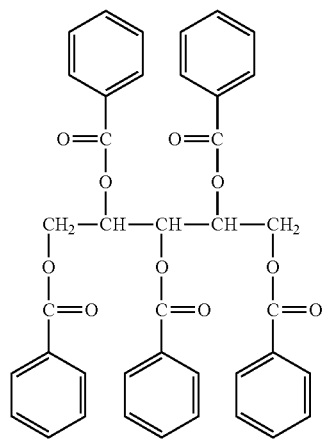
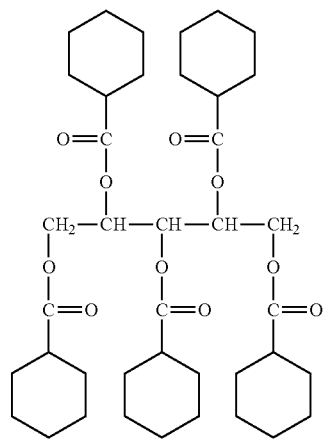
23
24
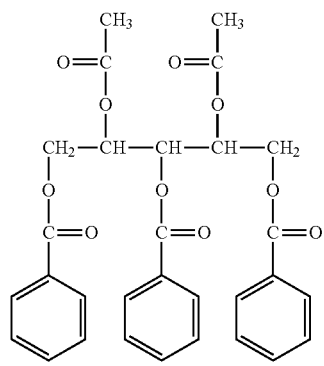
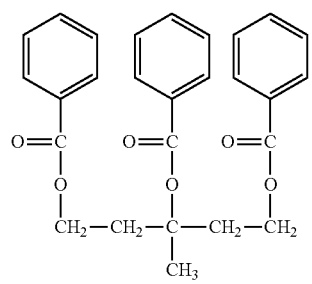
25
26
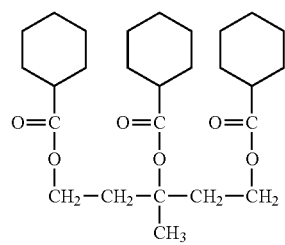
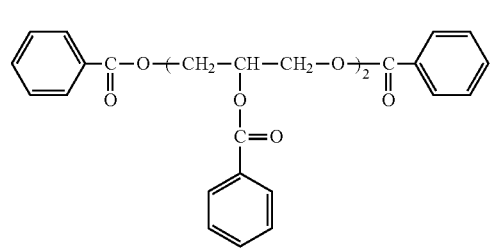
27
28
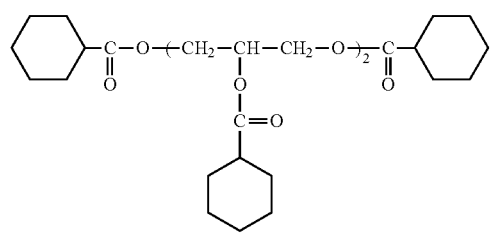
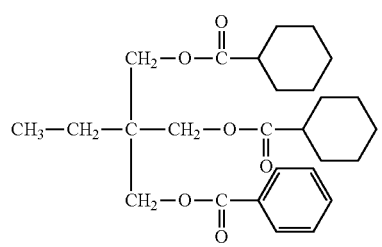
29
30
31

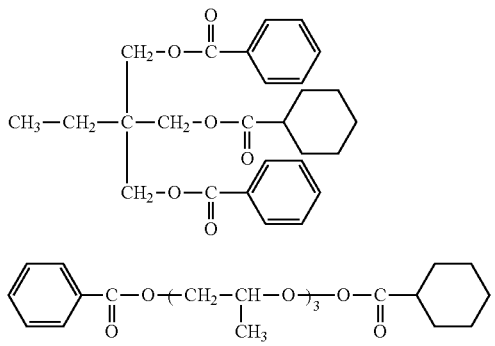

32

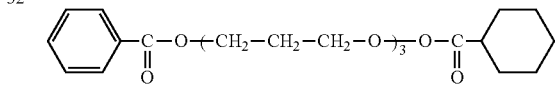

33

34

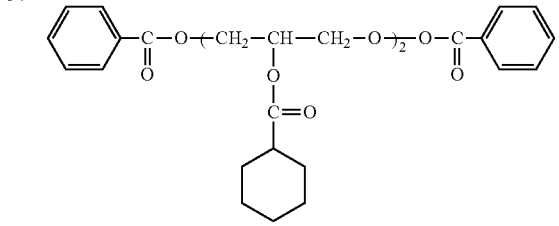

35

According to the invention, polycarboxylic acid-type plasticizes are also preferably used. Examples of the polycarboxylic acid-type plasticizer include plasticizes obtained by esterification of polycarboxylic acid having di- or more-valent (preferably from 2- to 20-valent) with alcohol. From 2- to 2-valent aliphatic polycarboxylic acids are preferable; and from 3- to 20-valent aromatic or aliphatic polycarboxylic acids are preferable.

Examples of the polycarboxylic acid include the compound represented by formula (3).

$$R^5(COOH)_m(OH)_n \tag{3}$$

In the formula, $R^5$ represents an (m+n)-valent organic group; m is a positive integer equal to or more than 2; n is an integer equal to or more than 0; COOH represents carboxyl; and OH represents an alcoholic or phenolic hydroxyl.

Examples of the polycarboxylic acid include, but are not limited to, those described below.

Examples of the polycarboxylic acid include 3- or more-valent aromatic polycarboxylic acids and derivatives thereof such as trimellitic acid, trimesic acid and pyromellitic acid; aliphatic polycarboxylic acids succinic acid, adipic acid, azelaic acid, sebacic acid, oxalic acid, fumaric acid, maleic acid, and tetrahydrophthalic acid; and oxy polycarboxylic acids such as tartaric acid, tartronic acid, malic acid and citric acid. Especially, oxy polycarboxylic acids are preferable in terms of improvement in retention ability.

The alcohol to be used for preparing the polycarboxylic acid esters is not limited, and may be selected from any alcohols and any phenols. Examples of the alcohol which can be used include $C_{1-32}$ linear or branched aliphatic saturated alcohols such as methyl alcohol, ethyl alcohol, propyl alcohol, isopropyl alcohol, butyl alcohol, isobutyl alcohol, sec-butyl alcohol, amyl alcohol, isoamyl alcohol, isoamyl alcohol and hexyl alcohol; and aliphatic unsaturated alcohols such as allyl alcohol and propargyl alcohol. $C_{1-20}$ alcohols are preferable and $C_{1-10}$ alcohols are more preferable. And examples of the alcohol which can be used include also alicyclic alcohols and derivatives thereof such as cyclopentanol and cyclohexanol; and aromatic alcohols and derivatives thereof such as benzyl alcohol and cinnamyl alcohol.

When oxy polycarboxylic acid(s) is used as a polycarboxylic acid, the alcoholic or phenolic hydroxyl(s) in the oxy polycarboxylic acid(s) may be esterified by monocarboxylic acid(s). Preferable examples of the monocarboxylic acid which can be used include, but are not limited to, those described below.

Preferable examples of the aliphatic monocarboxylic acid include $C_{1-32}$ linear or branched fatty acids. $C_{1-20}$ linear or branched fatty acids are more preferable, and $C_{1-10}$ linear or branched fatty acids are much more preferable.

Preferable examples of the aliphatic monocarboxylic acid include saturated aliphatic acids such as acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid; and unsaturated aliphatic acids such as undecylenic acid, oleic acid, sorbic acid, linoleic acid, linolenic acid and arachidonic acid.

Preferable examples of the alicyclic monocarboxylic acid include cyclopentane carboxylic acid, cyclohexane carboxylic acid, cyclooctane carboxylic acid and derivatives thereof.

Preferable examples of the aromatic monocarboxylic acid include single-ring aromatic monocarboxylic acids such as benzoic acid, toluic acid and other benzoic acid derivatives, obtained by introducing alkyl or alkoxy to a benzene ring of benzoic acid; plural-rings aromatic monocarboxylic acids such as biphenyl carboxylic acid, naphthalene carboxylic acid, tetralin carboxylic acid; and derivatives thereof. More specifically, examples of the carboxylic acid include xylic acid, hemellitic acid, mesitylenic acid, prehnitylic acid, γ-isodurylic acid, durylic acid, mesitoic acid, α-isodurylic, cumic acid, α-toluic acid, hydratropic acid, atropic acid, hydrocinnamic acid, salicylic acid, o-anisic acid, m-anisic acid, p-anisic acid, creosote acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, homovanillic acid, homoveratric acid, o-homoveratric acid, phthalonic acid, and p-coumalic acid; and benzoic acid is especially preferable.

The molecular weight of the polycarboxylic acid ester is not limited, and preferably, from 300 to 1000, and more preferably, from 350 to 750. In terms of improvement in retention ability, the polycarboxylic acid ester having a greater molecular weight is more preferable; on the other hand, in terms of moisture permeability and compatibility with cellulose acylate, the polycarboxylic acid ester having a smaller molecular weight is more preferable.

The alcohol to be used for preparing the polycarboxylic acid esters may be used singly or in combination with other alcohol(s).

The acid value of the polycarboxylic acid ester is not limited, and usually, the acid value is preferably equal to or smaller than 1 mgKOH/g, and more preferably equal to or smaller than 0.2 mgKOH/g. By adjusting the acid value to the above range, variation of retardation depending on the environment condition is reduced, which is preferable.

Preferable examples of the polycarboxylic acid ester include, but are not limited to, triethyl citrate, tributyl citrate, acetyl triethyl citrate (ATEC), acetyl butyl citrate (ATBC), benzoyl tributyl citrate, acetyl triphenyl citrate, acetyl tribenzyl citrate, tartaric acid dibutyl ester, tartaric acid diacetyl dibutyl ester, trimellitic acid tributyl and pyromellitic acid tetrabutyl ester.

The ester-type plasticizer is not limited, and is preferably selected from the ester-type plasticizers having at least one aromatic or cycloalkyl ring. Preferable examples of the ester-type plasticizer include the aromatic terminal ester-type plasticizers represented by formula (4).

B-(G-A)$_n$-G-B　　(4)

In the formula, B represents a benzene monocarboxylic acid residue; G represents a $C_{2-12}$ alkylene glycol residue, a $C_{6-12}$ aryl glycol residue or $C_{4-12}$ oxyalkylene glycol residue; A represents $C_{4-12}$ alkylene dicarboxylic acid residue or a $C_{6-12}$ aryl dicarboxylic acid residue; and n represents an integer equal to or more than 1.

The compound represented by formula (4) may be prepared according to the method same as those for preparing general polyester-type plasticizers.

Examples of the benzene monocarboxylic acid to be used for preparing the ester-type plasticizers include xylic acid, hemellitic acid, mesitylenic acid, prehnitylic acid, γ-isodurylic acid, durylic acid, mesitoic acid, α-isodurylic, cumic acid, α-toluic acid, hydratropic acid, atropic acid, hydrocinnamic acid, salicylic acid, o-anisic acid, m-anisic acid, p-anisic acid, creosote acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, homovanillic acid, homoveratric acid, o-homoveratric acid, phthalonic acid, p-coumalic acid, benzoic acid, p-tertbutyl benzoic acid, o-toluic acid, m-toluic acid, p-toluic acid, dimethyl benzoic acid, ethyl benzoic acid, n-propyl benzoic acid, amino benzoic acid, and acetoxy benzoic acid. These may be used singly or in combination with other(s).

Examples of the $C_{2-12}$ alkylene glycol which can be used for preparing the ester-type plasticizers include ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol(neopentyl glycol), 2,2-diethyl-1,3-propanediol (3,3-dimethylol pentane), 2-n-butyl-2-ethyl-1,3-propanediol (3,3-dimethylol heptane), 3-methyl-1,5-pentandiol, 1,6-hexanediol, 2,2,4-trimethyl 1,3-pentanediol, 2-ethyl-1,3-hexanediol, 2-methyl-1,8-octanediol, 1,9-nonanediol, 1,10-decanediol and 1,12-octadecanediol. And these glycols may be used singly or in combination with other(s). Especially, $C_{2-12}$ alkylene glycols are preferable in terms of compatibility with cellulose acylate.

Examples of the $C_{4-12}$ oxyalkylene glycol to be used for preparing the aromatic terminal esters include diethylene glycol, triethylene glycol, tetraethylene glycol, dipropylene glycol, and tripropylene glycol. And theses glycols may be used singly or in combination with other(s).

Examples of the $C_{4-12}$ alkylene dicarboxylic acid to be used for preparing the aromatic terminal esters include succinic acid, maleic acid, fumaric acid, pentanedioic acid, adipic acid, azelaic acid, sebacic acid and dodecane dicarboxylic acid. These compounds may be used singly or in combination with other(s). Examples of the C6-12 arylene dicarboxylic acid include phthalic acid, terephthalic acid, isophthalic acid, 1,5-naphthalene dicarboxylic acid and 1,4-naphthalene dicarboxylic acid.

The number-averaged molecular weight of the ester-type plasticizer is preferably from 300 to 1500, and more preferably from 400 to 1000. Preferably, the acid value thereof is equal to or smaller than 0.5 mgKOH/g, and the hydroxyl value thereof is equal to or smaller than 25 mgKOH/g; and more preferably, the acid value thereof is equal to or smaller than 0.3 mgKOH/g, and the hydroxyl value thereof is equal to or smaller than 15 mgKOH/g.

Examples of the method for preparing the aromatic terminal ester-type plasticizes which can be used are as follows.

<Sample No. 1 (a Sample of the Aromatic Terminal Ester)>

In a reactor, 410 parts of phthalic acid, 610 parts of benzoic acid, 737 parts of dipropylene glycol, and 0.40 parts of tetraisopropyl titanate as a catalyst were stocked, and heated under stirring in nitrogen atmosphere at a temperature from 30 to 250 degrees Celsius while excess of monovalent alcohol was refluxed with a reflux condenser so as to remove formed water continuously. The heat was continued till the acid value became equal to or smaller than 2. Subsequently, the mixture was heated at a temperature from 200 to 230 degrees Celsius under a pressure of $1.33 \times 10^4$ Pa (finally under a pressure of equal to or less than $4 \times 10^2$ Pa) to remove the distillate ingredients, and filtered to give an aromatic terminal ester having the following properties.

Viscosity (25 degrees Celsius, mPa·s): 43400

Acid value: 0.2

<Sample No. 2 (a Sample of the Aromatic Terminal Ester)>

An aromatic terminal ester, having the following properties, was prepared in the same manner as Sample No. 1, except that 410 parts of phthalic acid, 610 parts of benzoic acid, 341 parts of ethylene glycol, and 0.35 parts of tetraisopropyl titanate as a catalyst were stocked in a reactor.

Viscosity (25 degrees Celsius, mPa·s): 31000

Acid value: 0.1

<Sample No. 3 (a Sample of the Aromatic Terminal Ester)>

An aromatic terminal ester, having the following properties, was prepared in the same manner as Sample No. 1, except that 410 parts of phthalic acid, 610 parts of benzoic acid, 418 parts of 1,2-propanediol, and 0.35 parts of tetraisopropyl titanate as a catalyst were stocked in a reactor.

Viscosity (25 degrees Celsius, mPa·s): 38000

Acid value: 0.05

<Sample No. 4 (a Sample of the Aromatic Terminal Ester)>

An aromatic terminal ester, having the following properties, was prepared in the same manner as Sample No. 1, except that 410 parts of phthalic acid, 610 parts of benzoic acid, 418 parts of 1,3-propanediol, and 0.35 parts of tetraisopropyl titanate as a catalyst were stocked in a reactor.

Viscosity (25 degrees Celsius, mPa·s): 37000

Acid value: 0.05

Examples of the aromatic terminal ester, which can be used in the present invention, include, but are not limited to, those described below.

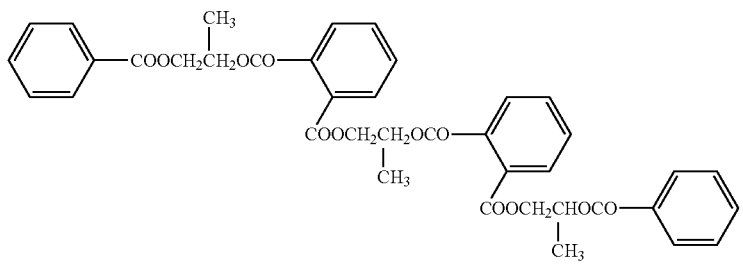
Mw: 696
(1)
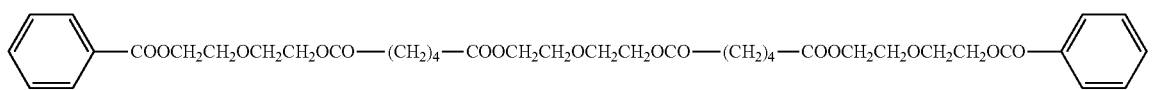
Mw: 746
(2)
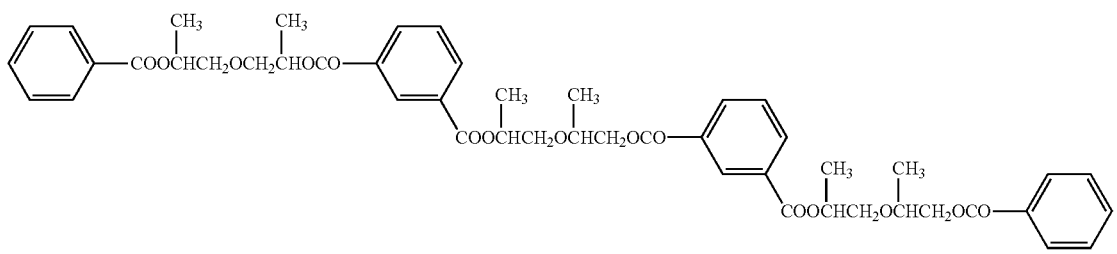
Mw: 830
(3)
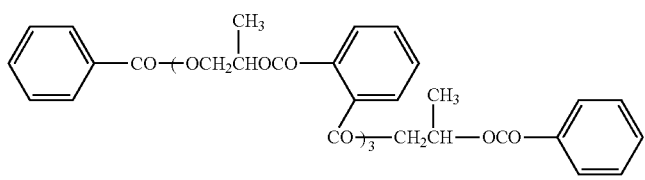
Mw: 886
(4)
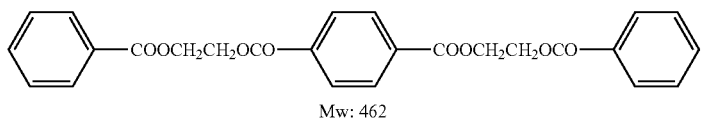
Mw: 462
(5)
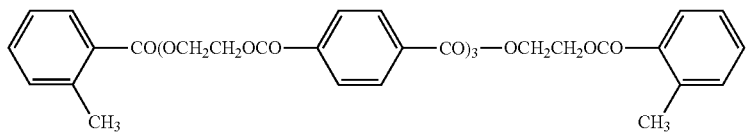
Mw: 874
(6)
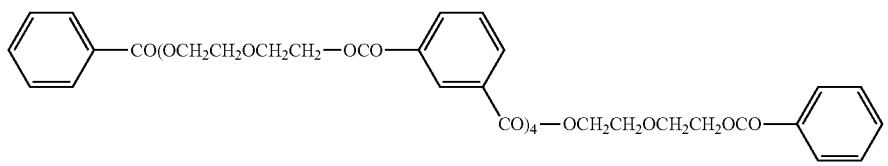
Mw: 1258
(7)
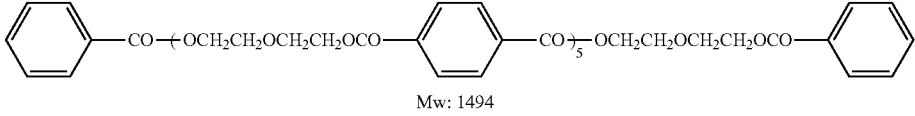
Mw: 1494
(8)

-continued

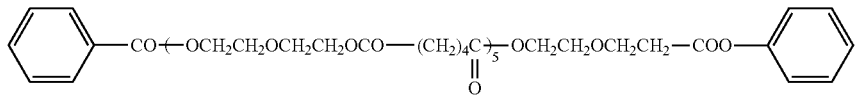
(9)

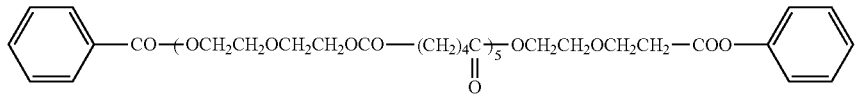
(9)

Mw: 1394

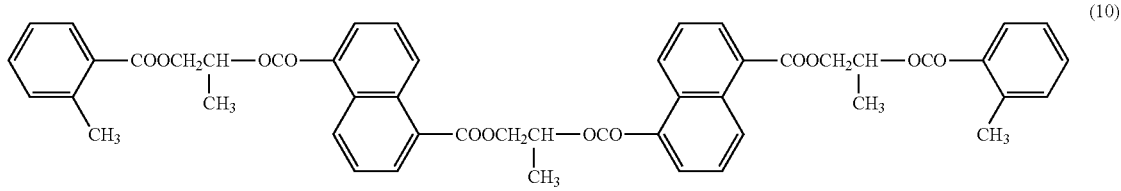
(10)

Mw: 852

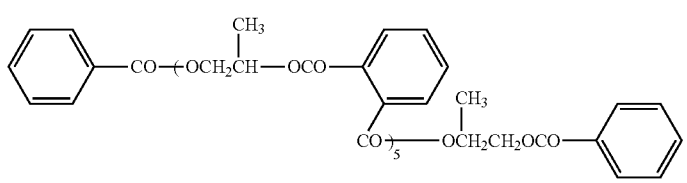
(11)

Mw: 1314

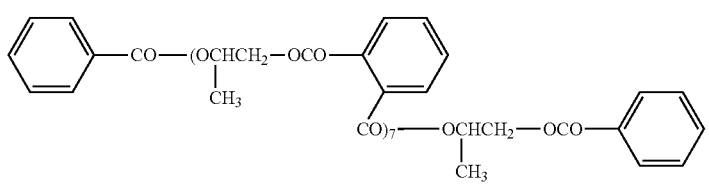
(12)

Mw: 1726

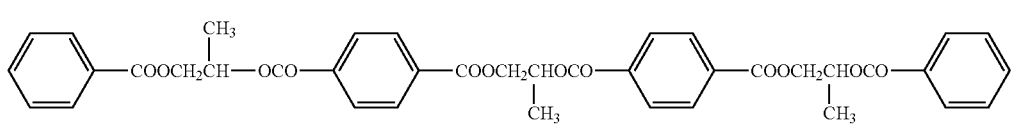
(13)

Mw: 696

These plasticizers may be used together with the above sugar ester compound. The amount of the plasticizer is preferably from 1 to 30% by mass, and more preferably from 1 to 20% by mass with respect to the amount of the cellulose acylate. In the embodiment containing both of the plasticizer(s) and the sugar ester(s), the total amount thereof is preferably from 5 to 30% by mass with respect to the amount of the cellulose acylate.

UV Absorbent Agent:

The cellulose acylate film of the invention may contain one or more UV absorbing agent. A layer containing one or more UV absorbing agent may be formed on the cellulose acylate film of the invention.

The compounds capable of almost absorbing UV light having a wavelength not longer than 370 nm are preferable; and the compounds capable of hardly absorbing UV light having a wavelength not shorter than 400 nm are preferable. Examples of the UV absorbent include, but are not limited to, triazine compounds, oxybenzophenone compounds, benzotriazole compounds, salicylate compounds, benzophenone compounds, cyanoacrylate compounds, and nickel complex compounds. The UV absorbent polymers described in JP-A 6-148430 are also preferable.

Examples of the benzotriazole-type UV absorbent usable in the invention are 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl) benzotriazole, 2,2-methylenebis(4-(1,1,3,3-tetramethylbutyl)-6-(2H-benzotriazol-2-yl)phenol, 2-(2'-hydroxy-3'-tert-butyl-5'-methylphenyl)-5-chlorobenzotriazole, 2-(2H-benzotriazol-2-yl)-6-(linear or branched dodecyl)-4-methylphenol, a mixture of octyl-3-[3-tert-butyl-4-hydroxy-5-(chloro-2H-benzotriazol-2-yl)phenyl]propionate and 2-ethylhexyl-3-[3-tert-butyl-4-hydroxy-5-(5-chloro-2H-benzotriazol-2-yl)phenyl]propionate, to which, however, the invention should not be limited. In addition, commercial products of TINUVIN 109, TINUVIN 171, TINUVIN 326 (all by Ciba Speciality Chemicals) are also preferably usable herein.

Examples of the benzophenone-type compound include, but are not limited to, 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenylmethane).

Examples of the UV absorbent agent, which can be used in the cellulose acylate film of the invention, include also the UV absorbents, having the partition coefficient of equal to or more than 9.2, described in JP-A 2000-187825. The UV absorbent agents having the partition coefficient of equal to or more than 10.1 are more preferable.

The UV absorbent polymers (polymers capable of absorbing UV) described in JP-A 6-148430 and JP-A 2002-47357 are also preferable. The UV absorbent polymers represented by formula (1) or (2) in JP-A 6-148430, and the UV absorbent polymers represented by formula (3), (6) or (7) in JP-A 2002-47357 are more preferable.

The UV absorbent to be used in the present invention is preferably selected from 1,3,5-triazine ring compounds. Such a compound may also function as an agent for controlling retardation.

The amount of the compound is preferably from 0.1 to 5% by mass, and more preferably from 0.5 to 1.5% by mass with respect to the amount of the cellulose acylate.

Antioxidant:

Antioxidant is usually called as an agent for inhibiting decomposition. When the liquid crystal display having the cellulose acylate film is left in the atmosphere of a high temperature and a high humidity, the cellulose acylate film sometimes decomposes. The antioxidant may function for delaying or inhibiting decomposition of the cellulose acylate film caused by halogen, which may be derived from the residual solvent, or by phosphoric acid, which may be derived from the phosphoric acid-type plasticizer.

Preferable examples of the oxidant include hindered phenol antioxidant such as 2,6-di-tert-butyl-p-cresol, pentaerythrityl tetrakis[3-(3,5-di-tert-butyl-4-hydroxyphenyl)propionate], triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, 2,2-thiodiethylene bis[3-(3-di-t-butyl-4-hydroxyphenyl) propionate], octadecyl-3-(3,5-di-t-butyl-4-hydroxyphenyl) propionate, N,N'-hexamethylene bis(3,5-di-t-butyl-4-hydroxy-hydroxynamide), 1,3,5-trimethyl-2,4,6-tris(3,5-di-t-butyl-4-hydroxybenzyl)benzene, and tris-(3,5-di-t-butyl-4-hydroxybenzyl)-isocyanate. Especially, 2,6-di-tert-butyl-p-cresol, pentaerythrityl tetrakis[3-(3,5-di-tert-butyl-4-hydroxyphenyl)propionate], and triethylene glycol-bis[3-(3-t-butyl-5-methyl-4-hydroxyphenyl)propionate] are preferable. And hydrazine-type metal deactivators such as N,N'-bis[3-(3,5-di-t-butyl-4-hydroxyphenyl)propionyl]hydrazine and phosphorous processing stabilizers such as tris(2,4-di-t-butylphenyl)phosphate are also preferable.

The amount of such a compound is preferably from 1 ppm to 1.0% by mass, and more preferably from 10 to 1000 ppm with respect to the amount of the cellulose acylate.

Promoters for Peeling:

Examples of the promoter for peeling which can be used in the present invention include ethyl esters of citric acid.

IR Absorbent Agent:

Examples of the IR absorbent agent which can be used in the present invention include those described in JP-A 2001-194522.

Mat Agent:

Fine particles such as a mat agent may be added to the cellulose acylate film of the invention for addition of slip ability. Examples of the fine particles include inorganic and organic fine particles. The amount of the fine particles is preferably from 0.01 to 1.0 g, more preferably from 0.03 to 0.5 g, and much more preferably from 0.08 to 0.3 g with respect to 1 $m^2$ of the cellulose acylate film. By adding the fine particles, convex superior portions having a height of from 0.1 to 1 μm are preferably formed on the surface of the film, which contributes to addition of slip ability.

Examples of the inorganic fine particles include silicon dioxide (silica), titanium dioxide, aluminium oxide, zirconium oxide, calcium carbonate, calcium carbonate, talc, clay, calcined kaolin, calcined calcium silicate, calcium silicate hydrate, aluminum silicate, magnesium silicate and calcium phosphate. Of the fine particles, preferred are those containing silicon as the haze of the film with them may be low, and more preferred is silicon dioxide. Fine particles such as silicon dioxide are usually subjected to surface treatment with organic material, and such particles are preferable since the haze of the film may be reduced. Examples of the organic material which can be used in the surface treatment include halosilanes, alkoxysilanes, silazanes and siloxanes.

Fine particles of silicon dioxide may be prepared by burning a mixture of gasified silicon tetrachloride and hydrogen in an atmosphere at a temperature of from 1000 to 1200 degrees Celsius. Preferably, fine particles of silicon dioxide for use herein have a primary mean particle size of from 1 nm to 20 nm and an apparent specific gravity of at least 70 g/liter. Those having a mean particle size of the primary particles of from 5 to 25 nm are more preferred as capable of reducing the haze of the film with them. The apparent specific gravity is preferably from 90 to 200 g/liter or more, more preferably from 100 to 200 g/liter or more. Having a larger apparent specific gravity, the particles may form a dispersion of high concentration, and they are favorable as capable of reducing the haze of the film with them and capable bettering their aggregates.

For fine particles of silicon dioxide, for example, herein usable are commercial products of AEROSIL R972, R972V, R974, R812, 200, 200V, 300, R202, OX50, TT600 (all by Nippon Aerosil); and AEROSIL 200V, R972, R972V, R974, R202 and R812 are preferable. Fine particles of zirconium oxide are commercially available, for example, as AEROSIL R976 and R811 (both by Nippon Aerosil), and they are usable herein.

Of those, especially preferred are AEROSIL 200V, AEROSIL R972V and AEROSIL TT600 are significantly effective for reducing the friction coefficient of the optical film with them while keeping the haze of the film low.

Examples of the fine particles of organic compound include fine particles of acrylic resion, silicone resin, fluorine compound resin, and polyurethane resin. Among these, fine particles of silicone resin are preferable, and fine particles of silicone resin having three-dimensional network structure are more preferable. Preferable examples of such a silicone resin include Tospearl 103, Tospearl 105, Tospearl 108, Tospearl 120, Tospearl 145, Tospearl 3120 and Tospearl 240 (by Momentive Performance Materials Inc.).

The mean particle size of the primary particles may be calculated based on the diameters of 100 particles obtained by observation with transmission electron microscope (magnification ratio: from half a million to 2 million).

The apparent specific gravity can be measured as follows. Fine particles are gauged by a graduated cylinder; the weight of the gauged particles is measured; and then the apparent specific gravity is calculated according to the following equation. Apparent specific gravity (g/L)=mass of fine particles (g)/volume of fine particles (L)

A layer containing fine particles may be formed by coating on the cellulose acylate film of the invention in place of adding fine particles to the film. The fine particles which can be used for forming the layer are not limited. As well as above, fine particles of silicon dioxide are preferable. One example of the layer is a layer having the thickness of from about 0.05 to about 5 μm and containing fine particles, having a mean particle size of from 0.01 to 3.0 μm, in the amount of from 0.1 to 50% by mass. The layer may contain a binder together with fine particles. Examples of the binder include cellulose acylate resins such as cellulose triacetate, cellulose diacetate, cellulose acetate propionate and cellulose acetate butyrate; and acryl resins. The solvent to be used for preparing the coating liquid is not limited, and include those exemplified as a solvent for preparing a dope which is used for preparing the cellulose acylate film of the invention. The layer may be formed during forming the cellulose acylate film or after forming the cellulose acylate film but before rolling-up the film; and the layer is preferably formed after rolling-up the film once.

1.-4 Production Method for Cellulose Acylate Film:

The cellulose acylate film of the present invention can be prepared by forming a film from the composition containing one or more cellulose acylates satisfying the above relations (I)-(III). The cellulose acylate film of the invention is preferably produced according to a solution-casting method (solvent-casting method). In particular, the cellulose acylate film of the present invention is preferably prepared by casting a solution, containing one or more above cellulose acylates, on a support. Preferable examples of the film-forming method are as follows.

1) Step of Dissolving (Step of Preparing a Dope)

The dope may be prepared by dissolving the above cellulose acylate(s) and at least one possible additive in an organic solvent, which contains a good solvent as a major ingredient, under stirring in a reactor. A dope may be also prepared by adding a solution of at least one additive to a solution of the above cellulose acylate(s). Specific examples of these methods include methods carrying out the dissolution at an ordinary pressure, methods carrying out the dissolution at a temperature of equal to or lower than the boiling point of the major solvent, methods carrying out the dissolution at a temperature of equal to or higher than the boiling point of the major solvent under application of pressure, methods using a means of cooling dissolution described in JP-A 9-95544, JP-A 9-95557 and JP-A 9-95538, and methods applying extra-high pressure described in JP-A 11-21379. Especially, methods carrying out the dissolution at a temperature of equal to or higher than the boiling point of the major solvent under application of pressure are preferable.

The concentration of the cellulose acylate in the dope is preferably from 10 to 35% by mass. The solid content in the dope is preferably equal to or more than 15% by mass, and more preferably from 18 to 35% by mass. The dope having the high solid content exhibits high viscosity, and the planarity of the film formed of such a dope may be lowered due to the shark-like skin generated during the casting step, which is not preferable.

The viscosity of the dope is preferably from 10 to 50 Pa·s. Any dissolution method may be selected from the above-mentioned methods; and the dissolution is preferably carried out at a temperature equal to or higher than the boiling point of the major solvent under application of pressure is preferable. In particular, the dissolution is preferably carried out at a temperature from 40.4 to 120 degrees Celsius under a pressure from 0.11 to 1.50 MPa; carrying out such a step may prevent foam formation and shorten the time for dissolving.

The recycled materials of the cellulose acylate film may be used in place of the cellulose acylate. The recycled materials are chips of films obtained during the process for preparing the films. The ratio of the recycled materials is preferably from 0 to 70% by mass, more preferably from 10 to 50% by mass and much more preferably from 20 to 40% by mass with respect to the solid content of the dope. The dope containing the recycled materials by the higher ratio exhibits a better filtration-property; on the other hand, the dope containing the recycled materials by the lower ratio exhibits a better slip-property; and the above range is preferable.

When the recycled materials are used, the amount of the additive such as plasticizer, UV absorbent and fine particles may be reduced for adjusting the formulation to the predetermined formulation.

The solvent for use in preparing the dope may be selected from organic solvents in which cellulose acylate can be dissolved. The organic solvent can be used with other organic solvent(s) even if the cellulose acylate cannot be dissolved in the organic solvent alone. One example of the good solvent for the cellulose acylate is methylene chloride. The mixed solvents of methylene chloride and any poor solvent(s) are preferable. The mixed solvents containing the poor solvent(s) in the amount of from 4 to 35% by mass are preferable.

Examples of the good solvent for the cellulose acylate include methylene chloride, methyl acetate, ethyl acetate, amyl acetate, acetone, tetrahydrofuran (THF), 1,4-dioxane, 1,3-dioxolan, cyclohexanone, ethyl formate, 2,2,2-trifluoro ethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol and nitro ethane. Among these, organic halogen compounds such as methylene chloride, dioxolan derivatives, methyl acetate and acetone are preferable as a good solvent. Using methyl acetate can reduce curling of the film, which is preferable.

Examples of the poor solvent for cellulose acylate which can be used in the invention include $C_{1-8}$ alcohols such as methanol, ethanol, n-propanol, iso-propanol, n-butanol, sec-butanol, and tert-butanol; and methyl ethyl ketone, methyl isobutyl ketone, ethyl acetate, propyl acetate, monochioro benzene, benzene, cyclohexane, tetrahydrofuran, methyl cellosolve, and ethylene glycol monomethyl ether. These poor solvents may be used singly or in combination with other(s).

The additive(s) may be added during the dissolution or after the dissolution, and dissolved or dispersed in the solution. After that, the dope may be filtered with any filter; bubbles in the dope may be removed; and then, the dope may be applied to the next step by a pump of solution sending. The plasticizer or antioxidant is preferably added to the dope.

The additive(s) may be added together with cellulose acylate and the solvent in the step of preparing the dope, or may be added to the dope during or after the step. The next step, casting step, is carried out using the dope prepared according to the above step.

2) Step of Casting

The dope is fed from a dope discharge opening to a pressure type die via a pressure type metering gear pump; and the dope is cast on a metal support of an endlessly running metal-belt having no edge such as a stainless belt or rotating metal-drum at a predetermined position via a pressured die-slit. A pressure-type die is preferable since the slit-shape of the die-cap portion can be adjusted and the thickness of the film can be adjusted to the desired range easily. Examples of the pressure-type die include a hanger coat die and a T-die, and are preferable used. The metal supports having a mirror-finished surface are preferable. For improving the film-forming rate, two or more pressure-type dies are disposed on the support, and the divided dope is cast on the support in the multilayered manner. Or plural dopes are co-cast on the support at the same time to give a multilayered cellulose acylate film.

3) Step of Evapolating Solvent

The web (a dope film formed by casting a dope on the metal support is referred to as "web") is dried on the metal support, and the solvent is evaporated from the web so that the web can be peeled off from the support. In order to evaporate the solvent, applying a wind to the web from the web side, heating the web by liquid at the rear side, and/or heating the web at both sides with radiation heat may be carried out. These methods may be carried out singly or in combination with other(s).

The film having a small value of Rth/Re can be prepared stably by adjusting the drying conditions as follows.

The averaged drying rate for just a minute after casting the solution on the support is preferably from 6 to 20 mass %/sec, and more preferably from 6 to 15 mass %/sec. The averaged drying rate is defined as follows.

Averaged Drying Rate[a minute]={Concentration of Solvent in Dope(% by mass)−Concentration of Residual Solvent in Web at a minute after Casting(% by mass)}/60 sec The drying rate is not required to be constant during a minute, and the drying rate is not required to be a constant velocity. The drying temperature and the drying rate may be increased or decreased continuously or discontinuously.

The averaged drying rate for just 30 seconds after casting the solution on the support is preferably from 8 to 30 mass %/sec, and more preferably from 8 to 20 mass %/sec. The averaged drying rate is defined as follows.

Averaged Drying Rate[30 seconds]={Concentration of Solvent in Dope(% by mass)−Concentration of Residual Solvent in Web at 30 seconds after Casting(% by mass)}/30 sec The drying rate is not required to be constant during 30 seconds, and the drying rate is not required to be a constant velocity. The drying temperature and the drying rate may be increased or decreased continuously or discontinuously.

Drying may be carried out by providing the web with blowing gas having a high temperature. A preferable example of the drying step is as follows. The web on the support is dried within a minute (preferably 30 seconds) after casting the solution on the support by providing the cast solution with blowing gas having a temperature of 50 degrees Celsius to 150 degrees Celsius (preferably from 70 degrees Celsius to 150 degrees Celsius, and more preferably from 90 degrees Celsius to 150 degrees Celsius) and a wind speed of from 3 to 15 m/sec (preferably from 5 to 15 m/sec, and more preferably from 6 to 15 m/sec). The drying step under the above conditions is preferably carried out till the residual solvent in the web is reduced by about 500 to about 300% by mass; and the drying step under the above conditions is usually carried out for about 30 seconds. The averaged drying rate, which is calculated according to the above formula, in the first drying step is preferably from 30 to 8% by mass, and more preferably from 20 to 8% by mass.

After the first drying step is carried out, the second drying step is preferably carried out by providing the web with blowing gas having a higher temperature compared with the first drying step. The second drying step is preferably carried out till the residual solvent in the web is reduced by about 350 to about 120% by mass; and the second drying step is usually carried out for about 30 seconds after the first drying step is finished. A preferable example of the second drying step is as follows. The web on the support is dried within a minute (preferably 30 seconds) after the first drying step is finished by providing the cast solution with blowing gas having a temperature of 100 degrees Celsius to 170 degrees Celsius (preferably from 110 degrees Celsius to 170 degrees Celsius, and more preferably from 120 degrees Celsius to 170 degrees Celsius). The averaged drying rate, which is calculated according to the above formula, in the second drying step is preferably from 10 to 1% by mass, more preferably from 8 to 1% by mass, and more preferably from 6 to 1% by mass.

After the second drying step is carried out, the third drying step is preferably carried out by providing the web with blowing gas having a higher temperature compared with the second drying step. The third drying step is preferably carried out till the residual solvent in the web is reduced by about 250 to about 50% by mass; and the third drying step is usually carried out for about 30 seconds after the second drying step is finished. The web is preferably fed into the peeling step described below. A preferable example of the third drying step is as follows. The web on the support is dried by providing the cast solution with blowing gas having a temperature of 30 degrees Celsius to 120 degrees Celsius (preferably from 40 degrees Celsius to 120 degrees Celsius, and more preferably from 50 degrees Celsius to 120 degrees Celsius) and a wind speed of from 3 to 15 m/sec (preferably from 3 to 12 m/sec, and more preferably from 3 to 10 m/sec). The averaged drying rate, which is calculated according to the above formula, in the third drying step is preferably from 5 to 0.2% by mass, more preferably from 4 to 0.2% by mass, and more preferably from 3 to 0.2% by mass.

The temperatures in the first, second and third steps preferably satisfy the relation of (the temperature of the second drying step)≧(the temperature of the first drying step)≧(the temperature of the third drying step) since the films having a low value of Rth/Re and high film-uniformity can be prepared.

4) Step of Peeling

The peeling step is the step of peeling the web, from which the solvent is evaporated, from the metal support at the peeling-position. The web peeled from the support may be fed into the next step. If the amount of the residual solvent, which is calculated according to the following formula, is much high, it may be difficult to peel the web from the support; on the other hand, if the amount of the residual solvent is much small, the web may separate from the support in midstream.

One example of the method for improving the film-forming rate is a gel casting method. The peeling step can be carried out for the web having as much as possible amount of the residual solvent, which can improve the film-forming rate. For example, the dope containing a poor solvent may be turned into a gel after being cast; or the dope may be turned into a gel by lowering the temperature of the metal support. If the dope is turned into a gel on the support, the film-strength may be improved, which makes it possible to carry out the peeling step earlier and therefore, improves the film-forming rate.

The amount of the residual solvent in the web when being peeled from the support may be decided depending on the strength of the web on the metal support or the length of the metal support; and usually, the amount of the residual solvent in the web when being peeled from the support is from 5 to 150% by mass. If the web is peeled from the support at the point having higher amount of the residual solvent, the planarity may be lowered or any defects such as the tightened portions and vertical wrinkles due to the peeling-tensile force may be generated easily if the web is very soft. Therefore, the amount of the residual solvent in the web when being peeled from the support may be decided in a balance between the film-forming rate and the quality. In the invention, the temperature of the web at the point being peeled from the support is preferably from 10 to 40 degrees Celsius, and more preferably from 15 to 30 degrees Celsius.

And the amount of the residual solvent in the web when being peeled from the support is preferably from 10 to 75% by mass, more preferably from 30 to 60% by mass, and much more preferably from 45 to 50% by mass. Peeled from the support when the amount of the residual solvent is within the above range, the film exhibits a low value of Rth/Re and the high uniformity due to low loading during peeling, which is preferable.

The amount of the residual solvent in the web is defined as follows.

The amount of the residual solvent(% by mass)=$\{(M-N)/N\} \times 100$

M represents the mass of a web at any point; and N represents the mass of the web after being dried at 110 degrees Celsius for three hours.

5) Steps of Drying and Stretching

After the peeling step, the web may be dried through a drying apparatus employing plural rolls which feed a web alternately and/or through a tenter apparatus employing clips which feed a web by grasping both ends of the web. The web is preferably stretched along the width between the clips in a stretching ratio from 1.0 to 2.0-fold; and such a stretching is preferably carried out by using the tenter. More preferably, the biaxially stretching along the machine direction and the traverse direction is carried out. If stretching is carried out biaxially, the relaxation may be carried out along the machine direction in a ratio from 0.8 to 1.0-fold, which may give desired retardation.

The temperature during stretching is preferably from 80 to 180 degrees Celsius, and more preferably from 90 to 160 degrees Celsius. The amount of the residual solvent in the web when being stretched is preferably from 5 to 50% by mass, and more preferably from 10 to 30% by mass. In this way, the film having the stable properties that Re and Rth are hardly varied depending on the ambient humidity can be prepared.

The means for drying the web are usually means of applying hot wind to the web; and microwaves may be applied to the web in place of hot wind. Rapidly drying may lower the planarity of the obtained film. The temperature for drying is preferably from 40 to 250 degrees Celsius through the whole process. The preferable temperature, amount of wind and time for drying may be varied depending on the solvent to be used; and the conditions for drying may be defined depending on the types or the combinations of the solvent to be used.

The thickness of the film is not limited; and for example, according to the above method, the films having the thickness from about 10 µm to about 1 mm may be prepared. The thickness of the film when the drying and stretching steps are terminated is preferably from 10 to 500 µm, more preferably from 30 to 120 µm, and much more preferably from 30 to 80 µm.

2. Applications of Cellulose Acylate Film

2.-1 Polarizing Plate

The present invention relates also to a polarizing plate having the cellulose acylate of the present invention. One example of the polarizing plate of the invention is a polarizing plate comprising a polarizing film and two protective films disposed the surfaces of the polarizing film respectively, wherein one of the protective films is the cellulose acylate film of the invention. Another protective film may be selected from any conventional cellulose acetate films.

Examples of a polarizing film include an iodine-base polarizing film, a dye-base polarizing film with a dichroic dye, and a polyene-base polarizing film, and any of these is usable in the invention. The iodine-base polarizing film and the dye-base polarizing film are produced generally by the use of polyvinyl alcohol films.

The polarizing plate of the invention may be prepared according to any general method. Examples of the method are described below, but are not limited.

At first, the cellulose acylate film of the invention is subjected to a surface treatment to improve adhesion between the cellulose acylate film and respective functional layers (e.g., an undercoat layer and a back layer). For example, glow discharge treatment, UV ray-irradiating treatment, corona treatment, flame treatment, or treatment with an acid or an alkali may be employed. The glow discharge treatment may be treatment with a low-temperature plasma generated in the presence of a low pressure gas of $10^{-3}$ to 20 Torr, or may preferably be a plasma treatment under atmospheric pressure. A plasma-generating gas means a gas which can be excited to generate plasma under the above conditions, and includes argon, helium, neon, cripton, xenon, nitrogen, carbon dioxide, Flons such as tetrafluoromethane and a mixture thereof. Detailed descriptions are given in Hatsumei Kyokai Gokai Giho (Kogi No. 2001-1745 issued on Mar. 15, 2001 by Hatsumei Kyokai) on pages 30 to 32. Additionally, in plasma treatment under atmospheric pressure which has been attracted attention in recent years, an irradiation energy of, for example, from 20 to 500 Kgy is employed under 10 to 1,000 Kev and, more preferably, an irradiation energy of from 20 to 300 Kgy is employed under 30 to 500 Kev. Among them, alkali saponification treatment is particularly preferred and is extremely effective as the surface treatment of cellulose acylate film.

The alkali saponification treatment is preferably conducted by directly dipping a cellulose acylate film into a tank retaining a saponifying solution or by coating a saponifying solution on a cellulose acylate film. As the coating method, there can be illustrated a dip coating method, a curtain coating method, an extrusion coating method, a bar coating method and an extrusion slide coating method. As the solvent for the coating solution to be used in the alkali saponification treatment, those solvents which impart to the saponifying solution a good wetting property for the transparent support and which do not form unevenness on the surface of the transparent support and maintain the surface state in a good condition are preferred. Specifically, alcoholic solvents are preferred, with isopropyl alcohol being particularly preferred. It is also possible to use an aqueous solution of a surfactant as the solvent. As the alkali to be used in the alkali-saponifying solution, alkalis soluble in the above solvent are preferred, and KOH and NaOH are more preferred. The pH of the saponifying coating solution is preferably 10 or more, more preferably 12 or more. As to reaction conditions upon saponification with alkali, the saponification is preferably conducted at room temperature for 1 second to 5 minutes, more preferably for 5 seconds to 5 minutes, particularly preferably for 20 seconds to 3 minutes. After the saponification reaction with alkali, the saponifying solution-coated surface is preferably washed with water or an acid.

The treatment for forming an adhesion layer may be carried out in place of the alkali-treatment, as described in JP-A 6-94915 and JP-A 6-118232.

Next, the surface, which is subjected to the alkali-treatment, of cellulose acylate film of the invention is stacked onto the surface of a polarizing film, which may be prepared by dipping and stretching a polyvinyl alcohol film in an iodine solution. Any adhesive may be used for stacking them. Examples of the adhesive which can be used in the invention include polyvinyl alcohol-based adhesives such as polyvinyl alcohol and polyvinyl butyral, and butyl acrylate based adhesives such as vinyl-based latex. Perfectly-saponified polyvinyl alcohols are preferable as an adhesive.

The cellulose acylate film of the invention is preferably stacked onto the polarizing film so that the transmission axis of the polarizing film coincides with the slow axis of the cellulose acylate film of the invention. Additionally, it has been found by evaluation of the prepared polarizing plate under cross-Nicol position of the polarizing plate that, when the rectangular accuracy between the slow axis of the cellulose acylate film of the invention and the absorption axis (axis crossing at right angles with the transmission axis) is more than 1.degree., polarizing performance under cross-Nicol position of the polarizing plate is deteriorated so much that there arises filtering of light. In such occasion, a sufficient black level or a sufficient contrast ratio can not be obtained when such polarizing plate is combined with a liquid crystal cell. Therefore, deviation between the direction of the main refractive index, nx, of the cellulose acylate film of the invention and the direction of the transmission axis of the polarizing plate is preferably within 1.degree., more preferably within 0.50.

The single plate transmittance TT, the parallel transmittance PT and the cross transmittance CT of the polarizing plate are measured by using UV3100PC (manufactured by SHIMADZU CORPORATION) within a range of 380 nm to 780 nm. In each of TT, PT and CT, the mean of values measured 10 times (mean within a range of 380 nm to 780 mm) is adopted. The polarizing plate durability test is carried out in two modes including (1) the polarizing plate alone and (2) the polarizing plate bonded to a glass plate via a pressure-sensitive adhesive. To measure the polarizing plate alone, two samples each having the cellulose acylate film according to the invention inserted between two polarizers are prepared and located orthogonally. In the mode of bonding the polarizing plate to a glass plate, two samples (about 5 cm×5 cm) each having the polarizing plate bonded to the glass plate in such a manner that the cellulose acylate film according to the invention is in the glass plate side are prepared. The single plate transmittance is measured by setting the film side of the samples toward a light source. Two samples are measured respectively and the mean is referred to as the transmittance of single plate.

It is preferable that single plate transmittance TT, the parallel transmittance PT, the cross transmittance CT (all of units: %) respectively fulfill the following relationships: $40.0 \leq TT \leq 45.0$, $30.0 \leq PT \leq 40.0$, and $CT \leq 2.0$; and it is still more preferable that these fulfill the following relations respectively: $41.0 \leq TT \leq 44.5$, $34 \leq PT \leq 39.0$ and $CT \leq 1.3$. The smaller variation obtained by the above test is more preferable.

It is preferable that the polarizing plate of the present invention fulfills at least one of the following formulae (j) and (k):

$$-6.0 \leq \Delta CT \leq 6.0 \quad \text{(j)}$$

$$-10.0 \leq \Delta P \leq 0.0 \quad \text{(k)}$$

$\Delta CT$ (%) and $\Delta P$ represent variations in cross transmittance and in polarization degree, respectively, in a test that the polarizing plate is allowed to stand at 60 degrees Celsius and 95% RH for 500 hours; and each of the variations mean a value calculated by subtracting a measurement value before the test from a measurement value after the test.

The polarizing plate fulfilling the above relations shows stability during usage or storage, which is preferable.

The polarizing plate has a polarizer and a protective film for protecting both sides thereof. In addition, the polarizing plate has a protecting film on one side thereof and a separate film adhered on the other side. The protecting film and separate film are each used for the purpose of protecting the polarizing plate when it is shipped or it is inspected. The protecting film is adhered to protect the surface of the polarizing plate and used on a side opposite to the surface of the polarizing plate to be laminated with the liquid crystal plate, while the separate film is used for covering the adhesion layer to be laminated with the a liquid crystal cell and is used on the side of the polarizing plate to be laminated with the liquid crystal plate.

The polarizing plate of the invention may have at least one layer such as a hard-coat layer, antiglare layer and antireflective layer on the surface of the protective film. The two protective films, one of which is a cellulose acylate film of the invention, may have one or more functional layers depending on the purpose.

2.-2 Optical Film

The cellulose acylate film of the invention may be used for preparing various optical films such as anti-reflective films. One example of the optical film is an optical film comprising a transparent support and an antiglare layer thereon, wherein the antiglare layer contains translucent resin and at least two types of translucent particles;

the thickness of the layer is from 10 to 15 μm;

the at least two types of translucent particles have a mean particle size of from 7 to 15 μm;

the difference in the absolute value of the refractive indexes between the at least two types of translucent particles is from 0.001 to 0.050; and the layer contains them in the amount of from 15 to 40% by mass.

The optical film has at least one antiglare layer on the transparent support. The antiglare layer is a layer having a light-scattering function due to surface scattering and/or inner scattering. The optical film may have one antiglare layer or plural antiglare layers, for example, from 2 to 4 antiglare layers.

Preferable examples of the layer-constitution of the optical film are as follows. And "a base material film" means a transparent support formed of a film.

a base material film/an antiglare layer a base material film/an antistatic layer/an antiglare layer a base material film/an antiglare layer/a low refractive index layer a base material film/an antiglare layer/an antistatic layer/a low refractive index layer a base material film/a hard coat layer/an antiglare layer/a low refractive index layer a base material film/a hard coat layer/an antiglare layer/an antistatic layer/a low refractive index layer a base material film/a hard coat layer/an antistatic layer/an antiglare layer/a low refractive index layer a base material film/an antiglare layer/a high refractive index layer/a low refractive index layer a base material film/an antiglare layer/a middle refractive index layer/a high refractive index layer/a low refractive index layer an antistatic layer/a base material film/an antiglare layer/a middle refractive index layer/a high refractive index layer/a low refractive index layer a base material film/an antistatic layer/an antiglare layer/a middle refractive index layer/a high refractive index layer/a low refractive index layer an antistatic layer/a base material film/an antiglare layer/a high refractive index layer/a low refractive index layer/a high refractive index layer/a low refractive index layer The optical layer may have other layer(s) such as a hard coat layer, an antistatic layer, a low refractive index layer and an antifouling layer in place of the antiglare layer. Preferably, the antiglare layer also functions as a hard coat layer, an antistatic layer or an antifouling layer. In the examples, preferably, at least of the middle refractive index layer and a high refractive index layer functions as an antistatic layer. In the constitution having three layers (a middle refractive index layer/a high refractive index layer/a low refractive index layer), preferably, the middle refractive index layer functions as an antistatic layer, in terms of achieving desired antistatic properties and refractive indexes.

In terms of low reflective properties, the anti-reflective film containing a middle refractive index layer, a high refractive index layer and a low refractive index layer is preferable; and, for example, the examples described in JP-A-8-122504, JP-A-8-110401, JP-A-10-300902, JP-A-2002-243906 and JP-A-2000-111706 are preferable.

Preferable embodiments of the anti-reflective film include the embodiments having an antiglare single layer on the transparent support and the embodiments having an antiglare single layer and a low refractive index single layer on the transparent support in this order.

<Constitution of Antiglare Layer>

The optical film may have an antiglare layer containing at least two types of translucent particles, having a mean particle size of from 7 μm to 15 μm, and a translucent resin. The antiglare layer may be prepared as follows. A coating liquid, containing the translucent particles, ingredient(s) capable of forming the matrix such as monomer(s) for binder and organic solvent, is applied to a surface and then dried and cured.

Examples of the ingredient in the coating liquid include monomer(s), which is a main material of the translucent resin, for binder capable of forming the matrix under ionized radiation or the like, translucent particles having the predetermined particle size, and polymerization initiator(s). And the coating liquid may contain also polymer(s) for controlling the viscosity, inorganic fine particle filler for reducing the curl or controlling the reflective index, and aid for dissolving.

The thickness of the antiglare layer is preferably from 10 μm to 15 μm, more preferably from 12 μm to 15 μm, and much more preferably from 13 μm to 14 μm. If the thickness of the layer is smaller than 10 μm, large concavities and convexities may be obtained by using the translucent particles, which may lower denseness of black; on the other hand, if the thickness of the layer is larger than 15 μm, small concavities and convexities may be obtained by using the translucent particles, which may lower the antiglare properties and brittleness.

<Translucent Particles for Antiglare Layer>

The mean particle size of the translucent particles is from 7 μm to 15 μm, preferably from 7.5 μm to 12 μm, and much more preferably from 8 μm to 12 μm. Using the particles having the mean particle size within the above range may achieve good antiglare properties and high denseness of black.

At least two types of the translucent particles are used in terms of scattering light as described below. Preferably, at least one of the mean particle size and the refractive index is different between at least two types of the particles. The embodiments containing two types of the particles (for example, particles A and Particles B) are preferable; and another particles C having the mean particle size same as either particles A or B may be added to the embodiments.

The amount of the translucent particles is preferable from 15 to 40% by mass, more preferably from 15 to 25% by mass and much more preferably from 15 to 20% by mass with respect to the total solid content. By adjusting the amount of the particles to the above range, the optical film having good antiglare and film-strength properties can be prepared.

The mass ratio of particles A to particles B is preferably from 25/75 to 75/25, more preferably from 37/63 to 75/25, and much more preferably from 50/50 to 75/25.

The mean particle size of the translucent particles means the primary particle size even if two or more particles exist in the coated layer adjacently, or even if the particles exist independently. If the agglomerating inorganic particles having the primary particle size of about 0.1 μm and having the secondary particle size within the above range are dispersed in the coating liquid, the mean particle size means the secondary particle size.

The surface scattering and the internal scattering are preferably controlled independently.

The internal scattering can be measured as a haze value (hereinafter referred to as "internal haze") due to the internal scattering; and the surface scattering can be measured as a haze value (hereinafter referred to as "surface haze") due to the surface haze, as described later.

For obtaining the desired internal scattering, preferably, the refractive indexes of the translucent particles and the translucent resin (matrix) are controlled. The absolute difference in refractive index between the translucent particles and the translucent resin is preferably from 0.001 to 0.050, more preferably from 0.005 to 0.040, much more preferably from 0.015 to 0.040, and even much more from 0.020 to 0.030. The difference in refractive index between particles A and B may be zero, however, it is preferable that the indexes thereof are different.

If the difference in refractive index is too small, the amount of the particles may be increased for obtaining the desired internal scattering, which may lower the film-strength. If the difference in refractive index is too large, the effect of making the unevenness in the displaying area less-visible may not be obtained.

Also, in the case of containing two kinds of particles A and B, it is also preferred to take an embodiment in which one of the particles has a refractive index lower than that of the matrix, and the other particle has a refractive index higher than that of the matrix. For example, the refractive index of the particle (particle A) having a higher refractive index is higher by from 0.010 to 0.050, more preferably from 0.020 to 0.040, and much more preferably from 0.020 to 0.030, compared with the translucent resin; and the refractive index of the particle (particle B) having a lower refractive index is lower by from 0.010 to 0.050, more preferably from 0.020 to 0.040, and much more preferably from 0.020 to 0.030, compared with the translucent resin. The difference in refractive index between the particles A and B may make it easier to control the internal scattering and the surface shape. By using the particles A and B having higher and lower refractive indexes respectively compared with the matrix, unpredictably, rainbow-colored unevenness or unevenness due to the displaying portion is not generated even if the surface of an LCD is illuminated by a three-wavelength fluorescent lamp.

The reasons of the rainbow-colored unevenness and unevenness due to the displaying portion are not clear, but are considered as follows. The rainbow-colored unevenness is observed on the surface of an image displaying device such as an LCD under a three-wavelength fluorescent lamp in the dark room. This may be caused by the internal reflective light reflected from the glass plate, the polarizing plate, circuits and black matrix around the positive reflected image. The unevenness due to the displaying portion is sometimes observed regarding the device displaying a gray solid image as a streaky or concentric ring-like unevenness. The reason is not clear, but can be a phenomenon generated due to the interference of shade and shadow from the backlight and black matrix.

Preferably, the mean particle sizes of the particles A and B are substantially same. In particular, the ratio ($\phi B/\phi A$) of the mean particle size of particle B ($\phi B$) to the mean particle size of particle A ($\phi A$) is preferably from 0.90 to 1.10, more preferably from 0.95 to 1.05, and much more preferably from 0.97 to 1.03. If the ratio of the mean particle size falls within the range, the surface condition may not be changed, which is preferable in terms of antiglare properties and denseness of black.

In another preferable embodiment, the translucent particles A having a refractive index which is absolutely different from that of the translucent resin by from 0.015 to 0.050, and the translucent particles B having a refractive index which is absolutely different from that of the translucent resin by from not less than 0.010 and less than 0.015 are used. In such an embodiment, preferably, the mean particle sizes of the particles A and B are different, and more preferably, fulfill $\phi A<\phi B$. According to the embodiment, the rainbow-colored unevenness is not observed even under a three-wavelength fluorescent lamp, which is preferable in terms of antiglare properties and denseness of black.

The translucent particles may be selected from the various particles described below depending on the desired refractive index, and mean particle size. Examples of the translucent particles include polymer particles, inorganic fine particles and mixtures thereof.

As specific examples of the resin particle, there are favorably exemplified resin particles, for example, a crosslinked polymethyl methacrylate particle, a crosslinked methyl methacrylate-styrene copolymer particle, a crosslinked polystyrene particle, a crosslinked methyl methacrylate-methyl acrylate copolymer particle, a crosslinked acrylate-styrene copolymer particle, a melamine-formamide resin particle, a benzoguanamine-formamide resin particle, etc. Of these, a crosslinked styrene particle, a crosslinked polymethyl methacrylate particle, a crosslinked methyl methacrylate-styrene copolymer particle and so on are preferable. Furthermore, so-called surface-modified particles obtained by chemically bonding a compound containing a fluorine atom, a silicon atom, a carboxyl group, a hydroxyl group, an amino group, a sulfonic acid group, a phosphoric acid group, etc. on the surface of such a resin particle; and particles obtained by bonding an inorganic fine particle with a nano size, such as silica and zirconia, on the surface thereof are also preferably exemplified.

Also, an inorganic fine particle can be used as the translucent particle. Specific examples of the inorganic fine particle include a silica particle and an alumina particle. Of these, a silica particle is especially preferably used.

In the case of making the matrix have a refractive index of not more than 1.54, and especially preferably not more than 1.53, in the invention, a crosslinked polymethyl methacrylate particle, a crosslinked methyl methacrylate-styrene copolymer particle and a silica particle are preferable as the translucent particle from the viewpoint of making coating unevenness or interference unevenness not conspicuous or the costs. In the case of using a crosslinked methyl methacrylate-styrene copolymer particle, a copolymerization ratio of styrene is preferably 10% or more and not more than 90%.

With respect to the shape of the particle, all of a truly spherical shape and an amorphous shape can be used. With respect to the particle size distribution, a monodispersed particle is preferable in view of control properties of a haze value and diffusibility and homogeneity of coating surface properties. The CV value, which indicates the uniformity of the particle size, is preferably equal to or less than 15%, more preferably equal to or less than 13% and much more preferably equal to or less than 10%. For example, in the case where a particle having a particle size of at least 33% larger than the average particle size is defined as a coarse particle, a proportion of this coarse particle is preferably not more than 1%, further preferably not more than 0.8%, and even further preferably not more than 0.4% of the number of all particles. If the number of the coarse particles is too large, the toughened surface is too significant, which is not preferable.

For example, in the case where a particle having a particle size of at least 16% smaller than the average particle size is defined as a small particle, a proportion of this small particle is preferably not more than 10%, further preferably not more than 6%, and even further preferably not more than 4% of the number of all particles. A particle having such particle size distribution is obtained by classification after a usual synthetic reaction. Examples of the classification which can be used include may be wind-power classification, centrifugal classification, sedimentation classification, filtration classification and electrostatic classification.

The particle size distribution of the translucent particle may be measured according to any method. The particle size distribution of the translucent particle is measured by a Coulter counter, and the measured distribution is converted into particle number distribution. Or the mean particle size of the primary particles may be calculated based on the diameters of 100 particles obtained by observation with transmission electron microscope (magnification ratio: from half a million to 2 million).

As the mean particle size, the value measured according to a Coulter-counter method is used.

The refractive index of the translucent particle can be measured by dispersing an equal amount of the translucent particle in a solvent prepared by changing a mixing ratio of two kinds of arbitrary solvents selected among methylene iodide, 1,2-dibromopropane and n-hexane and having a different refractive index from each other, thereby changing the refractive index, measuring a turbidity of the dispersion solution and then measuring a refractive index of the solvent when the turbidity becomes minimum by an Abbe's refractometer.

<Surface Morphology>

Any good balance between the antiglare properties and denseness of black is preferable. Regarding the antiglare properties, practically, good antiglare properties are required even if being illuminated in various directions by various light sources. Various lights reflected on the surface of the displaying device can be evaluated in a simple manner by changing the prospective angles of the reflected images. The good antiglare properties are required even under both of a large-size light source (for example, fluorescent lamp) and a slim-light source (for example, line light source such as a fluorescent lamp covered partially). Also regarding the denseness of black, good denseness of black is required when not only being observed in the direction normal to the displaying-plane but also in the oblique direction with about 45 degrees under a light-room environment. For achieving the good antiglare properties and good denseness of black evaluated by the above standard, the film preferably has the thickness falling within the above range and specific surface morphology. The preferable ranges on the particle size and the refractive index are preferable means for achieving the specific surface aspects by adjusting the thickness of the film to the above range.

The preferable surface morphology (surface convexoconcave) of the optical film is as follows.

The surface haze of the antiglare film is preferably from 0.2 to 10%, and more preferably from 0.5 to 5%. The larger surface haze may give lower denseness of black; and the lower surface haze may give lower antiglare properties.

The centerline average roughness (Ra) is preferably from 0.05 μm to 0.25 μm, more preferably from 0.10 μm to 0.20 μm, and even more preferably from 0.12 μm to 0.18 μm. The centerline average roughness (Ra) can be measured according to JIS-B0601(1982). The larger Ra may give lower denseness of black and lower contrast ratio in the light room; and the lower Ra may give lower antiglare properties.

For obtaining the surface morphology achieving any good balance between the antiglare properties and denseness of black, the averaged clearance (Sm) between concavity and convexity is also important. Sm is preferably from 50 μm to 350 μm, more preferably from 60 μm to 200 μm, even more preferably from 250 μm to 350 μm, and even much more preferably from 60 μm to 150 μm or from 300 μm to 350 μm.

The averaged clearance (Sm) can be measured according to JIS B0601(1994). The larger Sm may make the large-size reflected image of the light-source more easily-visualized. The smaller Sm may give lower denseness of black and weaker edge-gradation under a slim light source (for example, line light source), which is not preferable. If Sm is more than 200 μm and less than 250 μm, roughness of the surface may become distinguished, and the appearance may become worse It is more preferable that both of Ra and Sm fall within the above ranges respectively.

For improving the contrast ratio in a light room, it may be necessary that the averaged inclined angle θa is controlled. The averaged inclined angle θa is preferably from 0.5° to 3.0°, more preferably from 0.6° to 2.5°, and even more preferably from 0.6° to 2.0°. The larger averaged inclined angle may give lower denseness of black and weaker edge-gradation under a slim light source (for example, line light source), which is not preferable. The smaller averaged inclined angle may make the large-size reflected image of the light-source more easily-visualized.

The maximum inclined angle in the distribution of the averaged inclined angle is preferably equal to or smaller than 0.3°, more preferably equal to or smaller than 0.28°, and even more preferably equal to or smaller than 0.25°.

It is more preferable that both of the averaged inclined angle θa and the maximum inclined angle in the distribution of the averaged inclined angle within the above ranges respectively.

The averaged inclined angle of the optical film can be measured as follows.

First of all, vertexes of a triangle having an area of 0.5 to 2 μm² are supposed on a transparent substrate, and normal lines are extended vertically and upwardly from the vertexes (three lines normal to the substrate). A triangle is formed by connecting three points at which these three lines normal to the substrate intersect with the film surface. Then, an angle between a line normal to the triangle thus-formed and a normal line extended vertically and upwardly from the substrate surface is defined as a tilt angle. The proportion of tilt angles are determined by the following method. An area of at least 250,000 μm² (0.25 mm²) on the substrate is divided into the above-mentioned triangles and the inclined angle measurement is made on every triangle. The proportion of measuring points of an inclined angle to all the measuring points is determined, and this proportion is defined as the proportion of the tilt angle.

Figure 2B:
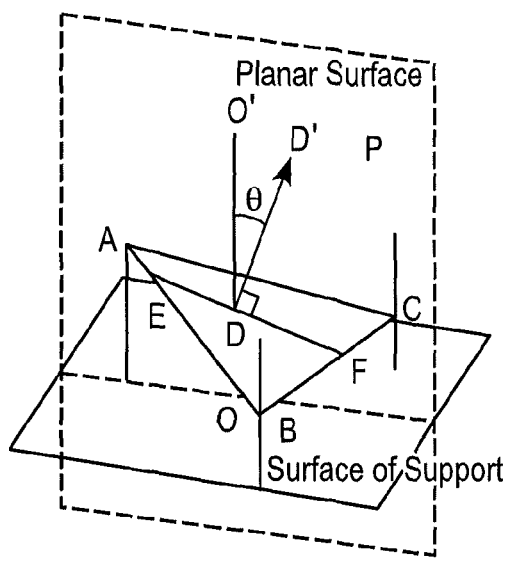
Figure 2C:
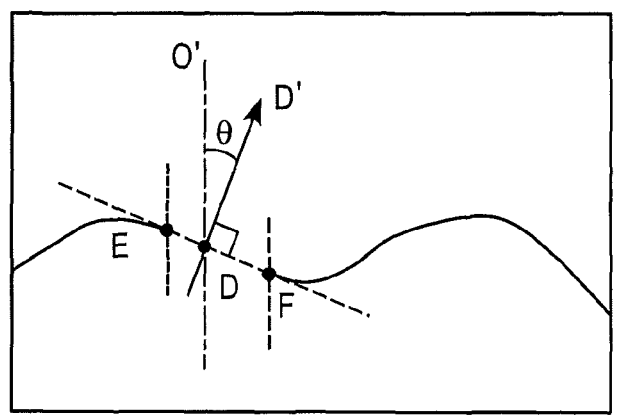

The method of measuring the inclined angle is described below in more detail. As shown in FIG. 2A, the substrate surface of the measurement sample is partitioned into meshes having areas of 0.5 to 2 μm². FIG. 2B is a diagram showing three points of one triangle constituting a partitioned mesh. From these three points on the substrate, normal lines are extended vertically and upwardly. Three points at which these normal lines intersect with the film surface are indicated by letters A, B and C. The angle θ which the normal line DD' to the plane of the triangle ABC forms with the normal line DO' extending vertically and upwardly from the substrate is defined as the tilt angle. FIG. 2C is a cross-sectional diagram of the film cut through at the plane P in which the points O', D and D' lie. The segment EF is an intersection line of the triangle ABC and the plane P. In the invention, the suitable area to be measured on the substrate is preferably at least 250,000 μm² (0.25 mm²). There are several devices usable for these measurements. In the invention, Model SXM520-AS150 made by Micromap Corporation (USA) is preferably used. When the object lens has a power of 10.times., the measurement unit for the inclined angle is set to 0.8 μm² and the area to be measured is set to 500,000 μm² (0.5 mm²). Potentially, by increasing the power of the objective lens, the measurement unit and the area to be measured may become small. Data obtained from those measurements is analyzed by use of a software program, such as MAT-LAB made by Math Works, Inc. (USA), and the distribution of inclined angles can be calculated.

By adjusting the surface haze and surface roughness to the above ranges respectively, antiglare films having good denseness of black and good antiglare properties can be obtained. And the internal haze is preferably from 10 to 35%, more preferably from 15 to 30%, and even more preferably from 20 to 20%. By adjusting the internal haze to the above range, the film may satisfy the actually-required qualities, in terms of both of the decrease in surface contrast ratio and the dazzling. The haze value can be adjusted by the types and the amount of the translucent particles.

The surface and internal haze values can be obtained as follows.

(1) The whole haze value (H) of an obtained film is measured according to JIS-K7136

(2) A few drops of silicone oil or liquid paraffin are dropped on the obverse of the low refractive index layer side of the obtained film and the reverse, the film is sandwiched between two glass plates (micro-slide glass, No. S 9111, manufactured by MATSUNAMI) having a thickness of 1 mm to completely optically stick two glass plates and the obtained film, and haze is measured in a state of excluding surface haze. Separately, silicone oil alone is inserted between two glass plates and haze is measured, and a computed value by subtracting this haze value from the above haze is taken as internal haze (Hi)

(3) A value obtained by subtracting the internal haze (Hi) computed in the above (2) from the whole haze value (H) measured in the above (1) is computed as the surface haze value (Hs).

<Translucent Resin of Antiglare Layer (Binder for Matrix)>

Though the binder for forming a matrix which forms the antiglare layer is not particularly limited, it is preferably a translucent polymer having, as a principal chain, a saturated hydrocarbon chain or a polyether chain after curing with ionizing radiations or the like. Also, it is preferable that the principal binder polymer after curing has a crosslinking structure.

The binder polymer containing, as a principal chain, a saturated hydrocarbon chain after curing is preferably an ethylenically unsaturated monomer selected among compounds of the following first group or a polymer thereof. Also, the polymer containing, as a principal chain, a polyether chain is preferably an epoxy based monomer selected among compounds of the following second group or a polymer obtained by ring opening thereof. Furthermore, polymers of a mixture of these monomers are also preferable.

In the invention, with respect to compounds of the first group, a polymer or a copolymer of a monomer having two or more ethylenically unsaturated groups is preferable as the binder polymer containing, as a principal chain, a saturated hydrocarbon chain and having a crosslinking structure. In order to make these polymer or copolymer have a high refractive index, it is preferable that the structure of this monomer contains an aromatic ring or at least one member selected from a halogen atom other than fluorine, a sulfur atom, a phosphorus atom and a nitrogen atom.

Examples of the monomer containing two or more ethylenically unsaturated groups which is used for the binder polymer for forming an antiglare layer include esters of a polyhydric alcohol and (meth)acrylic acid (for example, ethylene glycol di(meth)acrylate, 1,4-cyclohexane diacrylate, pentaerytlritol tetra(meth)acrylate, pentaerythritol tri(meth) acrylate, trimethylolpropane tri(meth)acrylate, trimethylolethane tri(meth)acrylate, dipentaerythritol tetra(meth) acrylate, dipentaerythritol penta(meth)acrylate, dipentaerythritol hexa(meth)acrylate, pentaerythritol hexa (meth)acrylate, 1,2,3-cyclohexane tetramethacrylate, polyurethane polyacrylate and polyester polyacrylate); vinylbenzene and derivatives thereof (for example, 1,4-divinylbenzene, 2-acryloylethyl 4-vinylbenzoate and 1,4-divinylcyclohexanone); vinylsulfones (for example, divinylsulfone); and (meth)acrylamides (for example, methylenebisacrylamide).

Furthermore, there are exemplified resins having two or more ethylenically unsaturated groups, for example, relatively low molecular weight polyester resins, polyether resins, acrylic resins, epoxy resins, urethane resins, alkyd resins, Spiro acetal resins, polybutadiene resins, polythiol polyene resins and oligomers or prepolymers of a polyfunctional compounds such as polyhydric alcohols. Two or more kinds of these monomers may be used in combinations. Also, it is preferable that the resin having two or more ethylenically unsaturated groups is contained in an amount of from 10 to 100% by mass based on the whole amount of the binder.

The polymerization of such an ethylenically unsaturated group-containing monomer can be carried out upon irradiation with ionizing radiations or by heating in the presence of a photo radical polymerization initiator or a heat radical polymerization initiator. Accordingly, the antiglare layer is formed by preparing a coating solution containing an ethylenically unsaturated group-containing monomer, a photo radical polymerization initiator or a heat radical polymerization initiator and particles and optionally, an inorganic filler, a coating auxiliary, other additives, an organic solvent, etc., coating the subject coating solution on a transparent support and then curing it by a polymerization reaction by ionizing radiations or heat. It is also preferred to combine curing by ionizing radiations with curing by heat. As the photo or heat polymerization initiator, commercially available compounds can be utilized. They are described in Saishin UV Koka Gijutsu (Latest UV Curing Technologies) (page 159, issuer: Kazuhiro Takasusuki, publishing office: Technical Information Institute Co., Ltd., published in 1991) and "Photo-polymerization Initiator" catalogues of Ciba Specialty Chemicals (for example, IRGACURE series and DAROCUR series).

In the invention, with respect to compounds of the second group, for the purpose of reducing curing and shrinkage of a cured film, it is preferred to use an epoxy based compound as described below. As such an epoxy group-containing monomer, a monomer containing two or more epoxy groups in one molecule thereof is preferable. Examples thereof include epoxy based monomers as described in JP-A-2004-264563, JP-A-2004-264564, JP-A-2005-37737, JP-A-2005-37738, JP-A-2005-140862, JP-A-2005-140863 and JP-A-2002-322430.

For the purpose of reducing curing and shrinkage, the epoxy group-containing monomer is preferably contained in an amount of from 20 to 100% by mass, more preferably from 35 to 100% by mass, and further preferably from 50 to 100% by mass based on the whole of binders constituting the layer.

Examples of a photo acid generator capable of generating a cation by the action of light for the purpose of polymerizing the epoxy based monomer or compound include ionic compounds such as triaryl sulfonium salts and diaryl iodonium salts and nonionic compounds such as a nitrobenzyl ester of sulfonic acid; and various known photo acid generators such as compounds described in Organic Materials for Imaging, edited by The Japanese Research Association for Organic Electronics Materials and published by Bun-Shin Shuppan K.K. (1997) and the like can be used. Of these, sulfonium salts and iodonium salts are especially preferable; and $PF_6^-$, $SbF_6^-$, $AsF_6^-$, $B(C_6H_5)_4^-$ and so on are preferable as a counter ion thereof.

The polymerization initiator is preferably used in an amount in the range of from 0.1 to 15 parts by mass, and more preferably in the range of from 1 to 10 parts by mass with respect to 100 parts of the foregoing first group compound.

The photo-acid-generating agent is preferably used in an amount in the range of from 0.1 to 15 parts by mass, and more preferably in the range of from 1 to 10 parts by mass with respect to 100 parts by mass of the foregoing second group compound.

<Polymer Compound for Antiglare Layer>

The antiglare layer of the invention may contain a polymer compound. By adding the polymer compound, it is possible to minimize curing and shrinkage or to regulate the viscosity of the coating liquid.

The polymer compound already forms a polymer at a point of time of addition in the coating solution. As the polymer compound, resins, for example, cellulose esters (for example, cellulose triacetate, cellulose diacetate, cellulose propionate, cellulose acetate propionate, cellulose acetate butyrate, cellulose nitrate, etc.), urethane acrylates, polyester acrylates, (meth)acrylic esters (for example, methyl methacrylate/methyl(meth)acrylate copolymers, methyl methacrylate/ethyl (meth)acrylate copolymers, methyl methacrylate/butyl (meth)acrylate copolymers, methyl methacrylate/styrene copolymers, methyl methacrylate/(meth)acrylic acid copolymers, polymethyl methacrylate, etc.), polystyrenes and so on are preferably used.

From the viewpoints of an effect against curing and shrinkage and an effect for increasing the density of the coating solution, the polymer compound is preferably contained in an amount in the range of from 1 to 50% by mass, and more preferably from 5 to 40% by mass relative to the whole of binders which are contained in the layer containing the polymer compound. Also, the molecular weight of the polymer compound is preferably from 3,000 to 400,000, more preferably from 5,000 to 300,000, and further preferably from 5,000 to 200,000 in terms of mass average.

<Inorganic Filler for Antiglare Layer>

In the antiglare layer of the invention, in addition to the foregoing translucent particle, inorganic filler can be used, for the purposes of adjusting the refractive index, adjusting the film strength and reducing curing and shrinkage and further depending upon reducing the reflectance in the case of providing a low refractive index layer. It is also preferable that the antiglare layer of the invention contains a fine inorganic filler with a high refractive index which is made of an oxide containing at least one metal element selected among titanium, zirconium, aluminum, indium, zinc, tin and antimony and which generally has an average particle size of not more than 0.2 µm, preferably not more than 0.1 µm, and more preferably not more than 0.06 µm and 1 nm or more in terms of a an average particle size of the primary particle.

In the case where it is necessary that the refractive index of the matrix is lowered for the purpose of regulating a difference in refractive index from the translucent particle, fine inorganic filler with a low refractive index such as a silica fine particles and a hollow silica fine particle can be used as the inorganic filler. A preferred particle size thereof is the same as in the foregoing fine inorganic filler with a high refractive index.

It is also preferable that the surface of the inorganic filler is subjected to a silane coupling treatment or a titanium coupling treatment, and a surface treating agent having a functional group capable of reacting with a species of the binder on the filler surface is preferably used.

The addition amount of the inorganic filler is preferably from 10 to 90% by mass, more preferably from 20 to 80% by mass, and especially preferably from 30 to 75% by mass of the total mass of the antiglare layer.

Since the inorganic filler has a particle size sufficiently shorter than the wavelength of light, it has such properties that scattering is not generated and that a dispersion material having the subject filler dispersed in a binder polymer is an optically uniform substance.

The refractive index of the antiglare layer is preferably from 1.46 to 1.65, more preferably from 1.49 to 1.60, and much more preferably from 1.49 to 1.53. If the refractive index falls within the above range, unevenness in coating or interference may become less-visible, and the strength of the antiglare layer may be improved.

Here, the refractive index of the film of the antiglare layer excluding the translucent particle can be directly measured by an Abbe's refractometer, or can be evaluated quantitatively by spectral reflectance measurement or spectral ellipsometry measurement.

<Surfactant for Antiglare Layer>

In the antiglare layer of the invention, in particular, for the purpose of ensuring uniformity in surface properties by suppressing a fault of surface properties such as coating unevenness, drying unevenness and point defect, it is preferable that any one or both of a fluorine based surfactant and a silicone based surfactant are contained in a coating composition for forming an antiglare layer. In particular, a fluorine based surfactant is preferably used because it reveals an effect for improving a fault of surface properties of the optical film of the invention such as coating unevenness, drying unevenness and point defect in a smaller addition amount. The surfactant is used for the purpose of enhancing the productivity by bringing high-speed coating adaptability while enhancing the uniformity in surface properties. Preferred examples of the fluorine based surfactant include compounds disclosed in paragraphs [0049] to [0074] of JP-A-2007-188070.

The addition amount of the surfactant (in particular, a fluorine based polymer) which is used in the antiglare layer of the invention is preferably in the range of from 0.001 to 5% by mass, more preferably in the range of from 0.005 to 3% by mass, and further preferably in the range of from 0.01 to 1% by mass relative to the coating solution. When the addition amount of the surfactant is 0.001% by mass or more, the effect is sufficient; and when it is not more than 5% by mass, drying of the coating film is sufficiently carried out, and a satisfactory performance (for example, reflectance and abrasion resistance) as the coating film is obtained.

<Organic Solvent of Coating Solution for Antiglare Layer>

An organic solvent can be added to the coating composition for forming an antiglare layer.

Examples of the organic solvent include alcohol based solvents such as methanol, ethanol, n-propanol, isopropanol, n-butanol, isobutanol, sec-butanol, tert-butanol, isoamyl alcohol, 1-pentanol, n-hexanol and methylamyl alcohol; ketone based solvents such as methyl isobutyl ketone, methyl ethyl ketone, diethyl ketone, acetone, cyclohexanone and diacetone alcohol; ester based solvents such as methyl acetate, ethyl acetate, n-propyl acetate, isopropyl acetate, isobutyl acetate, n-butyl acetate, isoamyl acetate, n-amyl acetate, methyl propionate, ethyl propionate, methyl butyrate, ethyl butyrate, methyl lactate and ethyl lactate; ether or acetal based solvents such as 1,4-dioxane, tetrahydrofuran, 2-methylfuran, tetrahydropyrane and diethyl acetal; hydrocarbon based solvents such as hexane, heptane, octane, isooctane, ligroin, cyclohexane, methylcyclohexane, toluene, xylene, ethylbenzene, styrene and divinylbenzene; halogenated hydrocarbon based solvents such as carbon tetrachloride, chloroform, methylene chloride, ethylene chloride, 1,1, 1-trichloroethane, 1,1,2-trichloroethane, trichloroethylene, tetrachloroethylene and 1,1,1,2-tetrachloroethane; polyhydric alcohol and its derivative based solvents such as ethylene glycol, ethylene glycol monomethyl ether, ethylene glycol monoethyl ether, ethylene glycol monoacetate, diethylene glycol, propylene glycol, dipropylene glycol, butanediol, hexylene glycol, 1,5-pentanediol, glycerin monoacetate, glycerin ethers and 1,2,6-hexanetriol; fatty acid based solvents such as formic acid, acetic acid, propionic acid, butyric acid, isobutyric acid, isovaleric acid and lactic acid; nitrogen compound based solvents such as formamide, N,N-dimethylformamide, acetamide and acetonitrile; and sulfur compound based solvents such as dimethyl sulfoxide.

Of these organic solvents, methyl isobutyl ketone, methyl ethyl ketone, cyclohexanone, acetone, toluene, xylene, ethyl acetate, 1-pentanol and so on are especially preferable. Also, for the purpose of controlling the cohesion properties, an alcohol or polyhydric alcohol based solvent may be properly mixed and used as the organic solvent. Such an organic solvent may be used singly or in admixture and is preferably contained in an amount of from 20% by weight to 90% by weight, more preferably from 30% by weight to 80% by weight, and most preferably from 40% by weight to 70% by weight in the terms of a total amount of the organic solvents in the coating solution. For the purpose of stabilizing the surface shape of the antiglare layer, it is preferred to use a solvent having a boiling point of lower than 100 degrees Celsius and a solvent having a boiling point of 100 degrees Celsius or high in combinations.

<Curing of Antiglare Layer>

The antiglare layer can be formed by coating the coating solution on a support and then applying irradiation with light, irradiation with electron beams, heating treatment, etc. thereto, thereby undergoing a crosslinking or polymerization reaction. In the case of irradiation with ultraviolet rays, ultraviolet rays emitted from light beams of an extra-high pressure mercury vapor lamp, a high pressure mercury vapor lamp, a low pressure mercury vapor lamp, a carbon arc lamp, a xenon arc lamp, a metal halide lamp and so on can be utilized. Curing by ultraviolet rays is preferably carried out in an atmosphere where an oxygen concentration is preferably controlled by purging with nitrogen, etc. to an extent of not more than 4% by volume, more preferably not more than 2% by volume, and most preferably not more than 0.5% by volume.

The layers other than the antiglare layer will be explained below.

<Low-Refractive Index Layer>

The optical film preferably has a layer (hereinafter referred to as "a low refractive index layer") whose refractive index is smaller than that of the antiglare layer, in terms of reducing the reflection ratio. The refractive index of the low refractive index layer is preferably from 1.20 to 1.46, more preferably from 1.25 to 1.46, and much more preferably from 1.30 to 1.40. The thickness of the low refractive index layer is preferably from 50 to 200 nm, and more preferably from 70 to 100 nm. The haze value of the low refractive index layer is preferably equal to or smaller than 3%, more preferably equal to or smaller than 2%, and even more preferably equal to or smaller than 1%.

Preferable modes of the curing compositions are as follows:

(1) a composition containing a fluoropolymer having a crosslinkable or polymerizable functional group;
(2) a composition containing a hydrolysis product of a fluorine-containing organosilane material as the main component; and
(3) a composition containing a monomer having two or more ethylenically unsaturated groups and inorganic microparticles having a hollow structure.

Preferably, the embodiments of (1) and (2) also contain inorganic fine particles, and more preferably they contain inorganic fine particles having a hollow structure, in terms of reducing the refractive index and controlling the amount of the inorganic fine particles and the refractive index.

(1) Fluorine-Containing Compound Having Crosslinkable or Polymerizable Functional Group As examples of the fluorine-containing compound having a crosslinkable or polymerizable functional group, a copolymer of a fluorine-containing monomer with a monomer having a crosslinkable or polymerizable functional group may be exemplified. Examples of such fluoropolymers are presented in JP-A-2003-222702, JP-A-2003-183322 and so on.

As mentioned in JP-A-2000-17028, the above-described polymer may optionally contain a curing agent having a polymerizable unsaturated group. As mentioned in JP-A-2002-145952, it is also preferable to employ a compound having a fluorine-containing multifunctional polymerizable unsaturated group together. Examples of the compound having a multifunctional polymerizable unsaturated group include monomers having two or more ethylenically unsaturated groups as discussed above. Moreover, use may be preferably made of a hydrolysis product of an organosilane as mentioned in JP-A-2004-170901 and a hydrolysis product of an organosilane having a (meth)acryloyl group is particularly preferred. These compounds are favorable because of having an effect of largely improving the scratch resistance in the case of using together with a compound having a polymerizable unsaturated group in the polymer.

In the case where the polymer per se has only insufficient curing properties when employed alone, the desired curing properties can be imparted by blending a crosslinkable compound. When the polymer has hydroxyl group, for example, various amino compounds are preferably usable as a curing agent. Examples of the amino compounds usable as crosslinkable compounds include compounds having two or more hydroxyalkyl amino groups and alkoxyalkylamino groups (either one of them or both) such as melamine-type compounds, urea-type compounds, benzoguanamine-type compounds, glycoluryl-type compound and so on. To cure such a compound, it is preferable to employ an organic acid or its salt.

(2) Hydrolysis Product of Fluorine-Containing Organosilane Material

It is also preferable to employ a composition containing a hydrolysis product of a fluorine-containing organosilane material as the main component since it has a low refractive index and a high film surface hardness. Use is preferably made of a condensation product of a compound having a hydrolyzable silanol group at one or both ends for fluoroalkyl group with a tetraalkoxysilane. Specific examples of such compositions are presented in JP-A-2002-265856 and JP-A-2002-317152.

(3) Composition Containing Monomer Having Two or More Ethylenically Unsaturated Groups and Inorganic Microparticles Having Hollow Structure As another preferable mode, a low-refractive index layer comprising particles having a low refractive index and a binder may be cited. Although the particles with a low refractive index may be either organic or inorganic ones, particles having a void inside are preferred. Specific examples of hollow particles are presented concerning silica particles in JP-A-2002-79616. The refractive index of the particles preferably ranges from 1.15 to 1.40, more preferably from 1.20 to 1.30. As the binder, use can be made of the monomer having two or more ethylenically unsaturated groups as described above concerning the antiglare layer.

It is preferable that the low-refractive index layer of the invention contains a polymerization initiator as described above concerning the light diffusion layer. In the case of containing a radical polymerizable compound, the polymerization initiator can be used in an amount of from 1 to 10 parts by mass, preferably from 1 to 5 parts by mass, based on the compound.

The low-refractive index layer of the invention may further contain inorganic particles. To impart scratch resistance, use can be made of microparticles having a particle diameter amounting to 15% to 150%, preferably 30% to 100%, more preferably 45% to 60%, of the thickness of the low-refractive index layer.

To impart various characteristics such as anti-fouling properties, water-proofness, chemical resistance and slipperiness, the low-refractive index layer of the invention may optionally contain publicly known polysiloxane-based or fluorinated anti-fouling agent, slipping agent and so on.

3. Liquid Crystal Display Device

The present invention relates to a liquid crystal display device having either the cellulose acylate film of the invention or the polarizing plate of the invention. An example is a liquid crystal display device having a pair of polarizing plates and a liquid crystal cell disposed between them. Preferably, at least one of the protective films of the polarizing plate is a cellulose acylate film of the invention. In another preferable embodiment, the protective film has at least one layer such as a hard coat layer, an antiglare layer and an antireflection layer thereon. The liquid crystal display device having such a constitution may be a lightweight and thin device.

Examples of the liquid crystal cell which can be used in invention are described below.

The liquid crystal display device of the invention may employ any mode such as TN (Twisted Nematic), IPS (In-Plane Switching), FLC (Ferroelectric Liquid Crystal), AFLC (Ant-Ferroelectric Liquid Crystal), OCB (Optically Compensatory Bend), STN (Super Twisted Nematic), VA (Vertically Aligned) and HAN (Hybrid Aligned Nematic). Of these, VA mode and OCB modes are particularly preferable, and VA is particularly more preferable.

In the VA mode liquid crystal cell, rod-shaped liquid crystal molecules are aligned substantially vertically upon no voltage being applied thereto.

The VA mode liquid crystal cell includes (1) a VA mode liquid crystal cell in the narrow sense wherein rod-shaped liquid crystalline molecules are aligned substantially vertically while no voltage being applied thereto and are aligned substantially horizontally while a voltage being applied thereto (JP-A-2-176625) and, in addition, (2) an MVA mode liquid crystal cell wherein the VA mode is modified to be multi-domain by projections so as to enlarge the viewing angle {described in SID97, Digest of tech. Papers, 28 (1997), p. 845}, (3) a n-ASM mode or CPA mode liquid crystal wherein rod-like liquid crystalline molecules are aligned substantially vertically while no voltage being applied thereto, and the molecules are oriented in twisted multi-domain alignment while a voltage being applied thereto {described in Abstracts of Japanese Forum of Liquid Crystal (written in Japanese), (1998), pp. 58 to 59 and Sharp Giho, No. 80, p. 11} and (4) a liquid crystal cell of SURVAIVAL mode wherein molecules are oriented in multi-domain alignment by an oblique electric field {Gekkan Display, No. 5, p. 14 (1999)} and a PVA mode liquid crystal cell {18.sup.th, IDRC Proceedings, p. 383 (1998)}.

One example of the VA-mode liquid crystal display, as shown in FIG. 1, has a liquid crystal cell (VA mode cell), and two polarizing plate (comprising TAC1, polarizer and TAC2) which are disposed on the two surfaces thereof respectively. The liquid crystal cell has a liquid crystal cell disposed between two electrode substrates, but are not shown in FIG. 1.

One embodiment of the liquid crystal display device of the invention is a transmissive liquid crystal display device having a cellulose acylate film of the invention as an optical compensation film which may be disposed between the liquid crystal cell and one of the two polarizing plate, or between the liquid crystal cell and both of the two polarizing plates.

Another embodiment of the liquid crystal display device of the invention is a transmissive liquid crystal display device having a cellulose acylate film of the invention as a protective film which is disposed between the liquid crystal cell and the polarizer. The cellulose acylate film of the invention may be used as a protective film disposed between the liquid crystal cell and one of the two polarizers, or used as two protective films disposed between the liquid crystal cell and the two polarizers respectively. Preferably, the cellulose acylate film of the invention is stacked at the VA-cell side, as well as TAC1. In the former embodiment, the polarizing plate having the cellulose acylate film of the invention may be used as an upper side (observer-side) polarizing plate or a downside (backlight-side) polarizing plate; and both embodiments show same functions. If the polarizing plate having the cellulose acylate film of the invention is used as an upper side (observer-side) polarizing plate, at least one functional layer may be needed on the observer-side surface, which may lower the yield ratio. Therefore, the embodiment using the polarizing plate, having the cellulose acylate film of the invention, as a downside polarizing plate is more preferable.

The liquid crystal display device having the two polarizing plates of the invention as the backlight-side and observer-side polarizing plates, shown in FIG. 1, is also one embodiment of the liquid crystal display device of the invention. The liquid crystal display device having the polarizing plate of the invention as a backlight-side polarizing plate is also one embodiment of the liquid crystal display device of the invention.

In FIG. 1, the protective film (TAC2) may be a common cellulose acylate film, and is preferably same as or thinner than the cellulose acylate film of the invention. The thickness is preferably from 40 to 80 µm, and there are illustrated commercially available KC4UX2M (40 µm; made by Konica Opto K.K.), KC5UX (60 µm; made by Konica Opto K.K.), and TD80UL (80 µm; made by Fuji Photo Film Co., Ltd.), though not being limited thereto.

EXAMPLES

Paragraphs below will further specifically explain the present invention referring to Examples and Comparative Examples, without limiting the present invention. The lubricant compositions in Examples and Comparative Examples were evaluated according to the methods described below.

1. Preparation of Cellulose Acylate Films 101 to 120.

At first, the dopes having the formulation and the concentration shown in the following table were prepared respectively. For preparing all of the dopes, a mixed solvent of methylene chloride and ethanol (methylene chloride/ethanol=5/1 (mass ratio)) was used respectively. The amounts of Additives 1 and 2, shown in the following table, were calculated as parts by mass with respect to 100 parts by mass of cellulose acylate.

TABLE 1

| | Cellulose Acylate | | | Additive 1 | | Additive 2 | | Concentration of |
|---|---|---|---|---|---|---|---|---|
| Film No. | Degree of acetyl substitution A | Degree of propionyl substitution B | Total degree of substitution A + B | Type *1 | Amount Parts by mass | Type *2 | Amount Parts by mass | solvent in dope % by mass with respect to Solid Content |
| 101 | 1.4 | 1.0 | 2.4 | Compound 1 | 15 | C | 10 | 495 |
| 102 | 1.4 | 1.0 | 2.4 | Compound 3 | 8 | 13 | 1.3 | 495 |
| 103 | 1.4 | 1.0 | 2.4 | Compound 3 | 8 | 13 | 1.3 | 495 |
| 104 | 1.0 | 1.4 | 2.4 | Compound 3 | 8 | 13 | 1.3 | 495 |
| 105 | 1.0 | 1.4 | 2.4 | Compound 3 | 8 | 13 | 1.3 | 495 |
| 106 | 1.4 | 0.6 | 2.0 | Compound 3 | 8 | 13 | 1.3 | 495 |

TABLE 1-continued

| | Cellulose Acylate | | | Additive 1 | | Additive 2 | | Concentration of |
|---|---|---|---|---|---|---|---|---|
| Film No. | Degree of acetyl substitution A | Degree of propionyl substitution B | Total degree of substitution A + B | Type *1 | Amount Parts by mass | Type *2 | Amount Parts by mass | solvent in dope % by mass with respect to Solid Content |
| 107 | 1.0 | 1.0 | 2.0 | Compound 3 | 8 | 13 | 1.3 | 495 |
| 108 | 0.8 | 1.2 | 2.0 | Compound 3 | 8 | 13 | 1.3 | 495 |
| 109 | 0.8 | 1.6 | 2.4 | Compound 3 | 8 | 13 | 1.3 | 495 |
| 110 | 1.4 | 1.0 | 2.4 | Compound 1 | 15 | C | 10 | 495 |
| 111 | 1.4 | 1.0 | 2.4 | Compound 1 | 15 | C | 10 | 495 |
| 112 | 1.4 | 1.0 | 2.4 | Compound 1 | 15 | C | 10 | 495 |
| 113 | 1.6 | 0.6 | 2.2 | Compound 1 | 15 | C | 10 | 495 |
| 114 | 0.6 | 1.8 | 2.4 | Compound 1 | 15 | C | 10 | 495 |
| 115 | 1.1 | 1.5 | 2.6 | Compound 1 | 15 | C | 10 | 495 |
| 116 | 0.9 | 0.9 | 1.8 | Compound 1 | 15 | C | 10 | 495 |
| 117 | 0.6 | 1.8 | 2.4 | Compound 1 | 15 | C | 10 | 495 |
| 118 | 2.7 | 0.0 | 2.7 | Compound X | 6 | C | 10 | 495 |
| 119 | 2.7 | 0.0 | 2.7 | Compound X | 6 | C | 10 | 495 |
| 120 | 1.6 | 0.6 | 2.2 | Compound 1 | 15 | C | 10 | 495 |

*1: Additive 1 having furanose structure is specified with the exemplified number of the above exemplified Compounds. And Compound X is the compound shown below.
Compound X: Retardation Enhancer

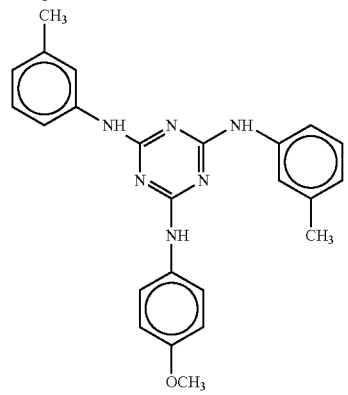

*2: Regarding Additive 2, "C" indicates trimethylol propane tribenzoate; and others, which are polyalcohol esters, are specified with the exemplified number of the above exemplified Compounds.

Each of the dope was cast on the surface of a metal support; and then, the first, second and third drying steps, the peeling step, and the stretching step were carried out under the conditions shown in the following tables.

The properties of each of the prepared cellulose acylate films were measured, and are shown in the following table.

TABLE 2

| | [1] First Drying Step | | | | | [2] Second Drying Step | | | | | [1]/[2] [6] | [3] Third Drying Step | | | | [4] Peeling Step | [5] Stretching Step | | | |
|---|---|---|---|---|---|---|---|---|---|---|---|---|---|---|---|---|---|---|---|---|
| No. | [1]-1 °C. | [1]-2 m/sec | [1]-3 sec | [1]-4 % by mass | [1]-5 mass %/sec | [2]-1 °C. | [2]-2 m/sec | [2]-3 sec | [2]-4 % by mass | [2]-5 mass %/sec | mass %/sec | [3]-1 °C. | [3]-2 m/sec | [3]-3 sec | [3]-4 % by mass | [4]-1 % by mass | [5]-1 % by mass | [5]-2 °C. | [5]-3 % | thickness (μm) |
| 101 | 100 | 10 | 30 | 150 | 11.5 | 130 | 12 | 30 | 100 | 1.7 | 6.6 | 70 | 5 | 60 | 0.8 | 50 | 20 | 130 | 40 | 40 |
| 102 | 100 | 10 | 30 | 150 | 11.5 | 130 | 12 | 30 | 100 | 1.7 | 6.6 | 70 | 5 | 60 | 0.8 | 50 | 20 | 130 | 40 | 40 |
| 103 | 100 | 15 | 30 | 130 | 12.2 | 140 | 15 | 30 | 80 | 1.7 | 6.9 | 70 | 5 | 60 | 0.6 | 45 | 20 | 130 | 40 | 40 |
| 104 | 100 | 15 | 30 | 130 | 12.2 | 140 | 15 | 30 | 80 | 1.7 | 6.9 | 70 | 5 | 60 | 0.6 | 45 | 20 | 130 | 40 | 40 |
| 105 | 100 | 15 | 30 | 130 | 12.2 | 140 | 15 | 30 | 80 | 1.7 | 6.9 | 70 | 5 | 60 | 0.6 | 45 | 20 | 130 | 36 | 40 |
| 106 | 100 | 15 | 30 | 130 | 12.2 | 140 | 15 | 30 | 80 | 1.7 | 6.9 | 70 | 5 | 60 | 0.6 | 45 | 20 | 130 | 40 | 35 |
| 107 | 100 | 15 | 30 | 130 | 12.2 | 140 | 15 | 30 | 80 | 1.7 | 6.9 | 70 | 5 | 60 | 0.6 | 45 | 20 | 130 | 40 | 35 |
| 108 | 100 | 15 | 30 | 130 | 12.2 | 140 | 15 | 30 | 80 | 1.7 | 6.9 | 70 | 5 | 60 | 0.6 | 45 | 20 | 130 | 40 | 35 |
| 109 | 100 | 15 | 30 | 130 | 12.2 | 140 | 15 | 30 | 80 | 1.7 | 6.9 | 70 | 5 | 60 | 0.6 | 45 | 20 | 130 | 40 | 45 |
| 110 | 30 | 2 | 30 | 320 | 5.8 | 40 | 2 | 30 | 200 | 4.0 | 4.9 | 40 | 2 | 60 | 1.5 | 110 | 20 | 130 | 30 | 40 |
| 111 | 30 | 2 | 30 | 320 | 5.8 | 40 | 2 | 30 | 200 | 4.0 | 4.9 | 40 | 2 | 60 | 1.5 | 110 | 20 | 130 | 30 | 60 |
| 112 | 30 | 2 | 30 | 320 | 5.8 | 40 | 2 | 30 | 200 | 4.0 | 4.9 | 40 | 2 | 60 | 1.5 | 110 | 20 | 130 | 40 | 40 |
| 113 | 100 | 10 | 30 | 150 | 11.5 | 130 | 12 | 30 | 100 | 1.7 | 6.6 | 70 | 5 | 60 | 0.8 | 50 | 20 | 130 | 40 | 40 |
| 114 | 100 | 10 | 30 | 150 | 11.5 | 130 | 12 | 30 | 100 | 1.7 | 6.6 | 70 | 5 | 60 | 0.8 | 50 | 20 | 130 | 40 | 40 |
| 115 | 100 | 10 | 30 | 150 | 11.5 | 130 | 12 | 30 | 100 | 1.7 | 6.6 | 70 | 5 | 60 | 0.8 | 50 | 20 | 130 | 40 | 40 |

TABLE 2-continued

| | [1] First Drying Step | | | | | [2] Second Drying Step | | | | | [1]/[2][6] mass %/sec | [3] Third Drying Step | | | | [4] Peeling Step [4]-1 % by mass | [5] Stretching Step | | | thickness (μm) |
|---|---|---|---|---|---|---|---|---|---|---|---|---|---|---|---|---|---|---|---|---|
| No. | [1]-1 °C. | [1]-2 m/sec | [1]-3 sec | [1]-4 % by mass | [1]-5 mass %/sec | [2]-1 °C. | [2]-2 m/sec | [2]-3 sec | [2]-4 % by mass | [2]-5 mass %/sec | | [3]-1 °C. | [3]-2 m/sec | [3]-3 sec | [3]-4 % by mass | | [5]-1 % by mass | [5]-2 °C. | [5]-3 % | |
| 116 | 100 | 10 | 30 | 150 | 11.5 | 130 | 12 | 30 | 100 | 1.7 | 6.6 | 70 | 5 | 60 | 0.8 | 50 | 20 | 130 | 40 | 40 |
| 117 | 100 | 10 | 30 | 150 | 11.5 | 130 | 12 | 30 | 100 | 1.7 | 6.6 | 70 | 5 | 60 | 0.8 | 50 | 20 | 130 | 47 | 38 |
| 118 | 100 | 15 | 30 | 130 | 12.2 | 140 | 15 | 30 | 80 | 1.7 | 6.9 | 70 | 5 | 60 | 0.6 | 45 | 20 | 150 | 55 | 45 |
| 119 | 100 | 15 | 30 | 130 | 12.2 | 140 | 15 | 30 | 80 | 1.7 | 6.9 | 70 | 5 | 60 | 0.6 | 45 | 20 | 150 | 60 | 43 |
| 120 | 100 | 10 | 30 | 150 | 11.5 | 130 | 12 | 30 | 100 | 1.7 | 6.6 | 70 | 5 | 60 | 0.8 | 50 | 20 | 130 | 42 | 34 |

[1]-1, [2]-1 and [3]-1: temperature of dry wind;
[1]-2, [2]-2 and [3]-2: wind speed of dry wind;
[1]-3, [2]-3 and [3]-3: time for drying;
[1]-4, [2]-4 and [3]-4: amount of residual solvent in the web at the time the drying step is finished;
[6]: averaged drying speed for the period from the beginning of casting to the ending of the second drying step;
[4]-1: amount of residual solvent in the web at the beginning of the peeling step;
[5]-1: amount of residual solvent in the web at the beginning of the stretching step;
[5]-2: temperature at the stretching step;
[5]-3: stretching ratio.

TABLE 3

| Film No. | Re nm | Rth nm | Rth/Re | Re(630) − Re(450) nm | Rth(630) − Rth(450) nm | Re(10% RH) − Re(80% RH) *1 nm | Rth(10% RH) − Rth(80% RH) *2 nm | Note |
|---|---|---|---|---|---|---|---|---|
| 101 | 53 | 120 | 2.3 | 3.5 | 5.5 | 8.4 | 14.0 | Invention |
| 102 | 65 | 120 | 1.8 | 4.3 | 5.5 | 10.3 | 14.0 | |
| 103 | 65 | 110 | 1.7 | 4.3 | 5.0 | 10.3 | 12.8 | |
| 104 | 65 | 100 | 1.5 | 4.3 | 4.6 | 7.2 | 8.2 | |
| 105 | 55 | 100 | 1.8 | 3.6 | 4.6 | 6.1 | 8.2 | |
| 106 | 70 | 120 | 1.7 | 4.6 | 5.5 | 13.4 | 16.8 | |
| 107 | 70 | 110 | 1.6 | 4.6 | 5.0 | 11.1 | 12.8 | |
| 108 | 70 | 100 | 1.4 | 4.6 | 4.6 | 8.9 | 9.3 | |
| 109 | 70 | 100 | 1.4 | 4.6 | 4.6 | 5.6 | 5.8 | |
| 110 | 35 | 131 | 3.7 | 2.3 | 6.0 | 5.6 | 15.2 | Comparative Example |
| 111 | 53 | 180 | 3.4 | 3.5 | 8.3 | 8.4 | 20.9 | |
| 112 | 53 | 135 | 2.5 | 3.5 | 6.2 | 8.4 | 15.7 | |
| 113 | 58 | 140 | 2.4 | 3.8 | 6.4 | 12.6 | 24.4 | |
| 114 | 51 | 90 | 1.8 | 3.4 | 4.1 | 3.2 | 4.2 | |
| 115 | 48 | 105 | 2.2 | 3.2 | 4.8 | 6.9 | 11.0 | |
| 116 | 60 | 135 | 2.3 | 4.0 | 6.2 | 10.5 | 17.3 | |
| 117 | 60 | 80 | 1.3 | 4.0 | 3.7 | 3.8 | 3.7 | |
| 118 | 65 | 110 | 1.7 | −4.0 | −3.0 | 7.2 | 10.9 | |
| 119 | 70 | 110 | 1.6 | −4.3 | −3.1 | 7.7 | 10.9 | |
| 120 | 53 | 120 | 2.3 | 3.5 | 5.5 | 12.6 | 21.0 | |

*1 Re(10% RH) − Re(80% RH) indicates the difference between Re measured at 25 degrees Celsius and 10% RH and Re measured at 25 degrees Celsius and 80% RH.
*2 Rth(10% RH) − Rth(80% RH) indicates the difference between Rth measured at 25 degrees Celsius and 10% RH and Rth measured at 25 degrees Celsius and 80% RH.

2. Preparation of Polarizing Plates

Polarizing plates were prepared by using the prepared cellulose acylate film samples respectively.

Alkali-Saponification Treatment

Each of the cellulose acylate film was subjected to an alkali-saponification treatment under the following conditions, then, was subjected to water-washing, neutralization and water-washing treatments under the following conditions in this order, and then, dried at 80 degrees Celsius.

Saponification step: 2 mol/L-NaOH solution, 50 degrees Celsius, and 90 seconds

Water-washing step: water, 30 degrees Celsius, and 45 seconds

Neutralization step: 10% by mass of HCl solution, 30 degrees Celsius, and 45 seconds Water-washing step: water, 30 degrees Celsius, and 45 seconds Preparation of Polarizer A rolled-up polyvinyl alcohol (PVA), film having a thickness of 120 μm, was dyed by dipping it in 100 parts by mass of an aqueous solution containing iodine of 1 part by mass and boric acid of 4 parts by mass, and then was stretched in the machine direction by 5 times the original length to give a polarizing film. Saponified "FUJITAC TD80UL" or "FUJITAC TD60UL" or antiglare-antireflection film A-1, which was prepared according to the method described below, was stacked on one surface of the polarizing film; each of the cellulose acylate films was stacked on another surface thereof by using 5% aqueous solution of perfectly-saponified polyvinyl alcohol as an adhesive; and then, the obtained laminations were dried. In this way, polarizing plates were prepared.

Preparation of Antiglare-Antireflection Film A-1:

A coating liquid A-1 to be used for preparing an antiglare layer, having the following formulate, was prepared for Formulation of Coating Liquid A-1 for Antiglare Layer

| | |
|---|---|
| PET-30 | 65.0 g |
| IRGACURE 127 | 3.0 g |
| Dispersion liquid of 8 μm crosslinked acryl/styrene particles a (30%) | 52.6 g |
| Dispersion liquid of 8 μm crosslinked acryl particles b (30%) | 20.0 g |
| SP-13 | 0.2 g |
| CAB-531-1 | 0.5 g |
| MIBK | 72.6 g |
| MEK | 32.5 g |

Formulation of Coating Liquid L-1 for Low Refractive Index Layer

| | |
|---|---|
| Fluorinated polymer having ethylenic unsaturated group (A-1) | 3.9 g |
| Dispersion of silica A (22%) | 25.0 g |
| IRGACURE 127 | 0.2 g |
| DPHA | 0.4 g |
| MEK | 100.0 g |
| MIBK | 45.5 g |

The coating liquid for low refractive index layer was filtrated with a polypropylene filter having a pore size of 1 μm. The refractive index of the low refractive index layer formed by curing the coating liquid was 1.360.

The ingredients of the coating liquids are shown below.

PET-30: Mixture of pentaerythritol triacrylate and pentaerythritol tetraacrylate [by Nippon Kayaku Co., Ltd.];

DPHA: Mixture of dipentaerythritol pentaacrylate and dipentaerythritol hexaacrylate [by Nippon Kayaku Co., Ltd.];

Dispersion liquid of 8 μm crosslinked acryl/styrene particles a (30%): 30% Dispersion prepared by dispersing 8 μm crosslinked acryl/styrene particles a (refractive index 1.555, particle size 8.0 μm) [by Sekisui Plastics Co., Ltd.] in MIBK by a polytron disperser at 10,000 rpm for 20 minutes;

Dispersion liquid of 8 μm crosslinked acryl particles b (30%); 30% Dispersion prepared by dispersing 8 μm crosslinked acryl particles b (refractive index 1.500, particle size 8.0 μm) [by Sekisui Plastics Co., Ltd.] in MIBK by a polytron disperser at 10,000 rpm for 20 minutes;

IRGACURE 127: Polymerization initiator [by Ciba specialty Chemicals];

CAB-531-1: Cellulose acetate butyrate [by Eastman Chemical];

Fluorinated polymer having ethylenic unsaturated group (A-1): Fluorinated polymer prepared according to Production Example 3, described in JP-A-2005-89536;

SP-13: Fluorinated surfactant (10% by mass of solution prepared by dissolving it in MEK).

A dispersion of silica was prepared as follows.

To 500 g of a hollow silica fine particle sol (isopropyl alcohol silica sol, average particle size: 60 nm, shell thickness: 10 nm, silica concentration: 20% by mass, refractive index of silica particle: 1.31; as prepared by changing the size according to Preparation Example 4 of JP-A-2002-79616), 10 g of acryloyloxypropyl trimethoxysilane (by Shin-Etsu Chemical Co., Ltd.) and 1.0 g of diisopropoxyaluminum ethyl acetoacetate were added and mixed. After adding 3 g of ion exchanged water, the mixture was allowed to react at 60 degrees Celsius for 8 hours. After cooling to room temperature, 1.0 g of acetyl acetone was added. Solvent substitution was carried out by distillation in vacuo under a pressure while adding cyclohexanone to 500 g of this dispersion such that the content of silica became constant. The dispersion was free from the generation of a foreign matter. When the solids content was adjusted with cyclohexanone at 22% by mass, the viscosity was found to be 5 mPas at 25 degrees Celsius. The residual amount of isopropyl alcohol in the obtained dispersion A was analyzed by gas chromatography. As a result, it was found to be 1.0%.

(1) Preparation of Antiglare Layer

An 80 μm-thick triacetyl cellulose film "FUJITAC TD80UL" (manufactured by Fuji Photo Film Co., Ltd.) was wound out in a rolled state; the foregoing coating liquid for antiglare layer (A-1) was coated according to a die-coating method employing a slot die, described in JP-A 2006-122889, Example 1, under the condition of a conveyance rate of 30 m/min; after drying at 60 degrees Celsius for 150 seconds, the coating layer was hardened upon irradiation with ultraviolet rays having a radiation illuminance of 400 mW/cm$^2$ and an irradiation dose of 100 mJ/cm$^2$ by using an air-cooled metal halide lamp (manufactured by Eyegraphics Co., Ltd.) of 160 W/cm under purging with nitrogen in an oxygen concentration of 0.1% by volume, thereby forming a layer, followed by winding up. The thus prepared and obtained antiglare layer had a thickness of 14.0 μm.

(2) Preparation of Low Refractive Index Layer

The film having the antiglare layer thereon was wound out in a rolled state again; and on the thus obtained antiglare layer, the foregoing coating solution for low refractive index layer (L-1) was coated according to the above die-coating method employing a slot die under the condition of a conveyance rate of 30 m/min; after drying at 90 degrees Celsius for 75 seconds, the coating layer was hardened upon irradiation with ultraviolet rays having a radiation illuminance of 400 mW/cm$^2$ and an irradiation dose of 240 mJ/cm$^2$ by using an air-cooled metal halide lamp (manufactured by Eyegraphics Co., Ltd.) of 240 W/cm under purging with nitrogen in an oxygen concentration of from 0.01% to 0.1% by volume, thereby forming a low refractive index layer having a thickness of 100 nm, followed by winding up.

In this way, Antiglare-Antireflection Film A-1 was prepared. The properties of the film were shown in the following table.

TABLE 4

| Ra (μm) | Sm (μm) | θa (°) | Maximum Angle in Distribution of Inclined Angle (°) | Surface Haze (%) | Internal Haze* (%) | Averaged Reflection Rate (%) | Denseness of black | Antiglare Property | Brittleness |
|---|---|---|---|---|---|---|---|---|---|
| 0.15 | 70 | 1.8 | 0.4 | 4.0 | 22 | 1.3 | ⊚ | ○ | ○ |

3. Preparation and Evaluation of VA Mode Liquid Crystal Display Devices

Preparation of VA Mode Liquid Crystal Display Devices

The mounted two polarizing plates in 40-type display "KDL-40J5000", that is, a VA-mode liquid crystal display device, were removed therefrom; and, in place of them, same two polarizing plates selected from the prepared polarizing plates were stacked on the surfaces of the glass substrates of the VA-mode liquid crystal cell respectively. In this way, liquid crystal displays were prepared.

The observer-side polarizing plate was stacked, so that the absorption axis thereof was along the long side (horizontal direction) of the displaying plane; and the backlight-side polarizing plate was stacked, so that the absorption axis thereof was along the short side (vertical direction) of the displaying plane.

Evaluation of VA Mode Liquid Crystal Display Devices

Regarding each of the prepared VA mode Liquid crystal Display Devices, the contrast ratio (the ratio of white brightness to black brightness) in oblique direction (azimuth angle of 45°, polar angle of 60°) and the color-shift (azimuth angle of from 0 to 360°, polar angle of 60°) were measured under the environment at 25 degrees Celsius and 60% RH by using "EZ-Contrast160D" (by ELDIM). The contrast ratio in the oblique direction was measured initially; and the contrast ratio in the oblique direction was measured again after the device was left in a chamber at 80 degrees Celsius and RH of not greater than less than 10% RH for 120 hours and then, was left under an environment at 25 degrees Celsius and 60% RH for an hour. The degree of the color shift is represented by Δu'v' which is defined as follows.

$$\Delta u'v' = \{(u' - u'_{0,60})^2 + (v' - v'_{0,60})^2\}^{0.5}$$

In the formula, $u'_{0,60}$ and $v'_{0,60}$ represent u'v' chromaticity $(u'_{0,60}, v'_{0,60})$ of the liquid crystal display device in the direction defined by the azimuth angle of 0° and the polar angle of 60° respectively. And u' and v' represent u'v' chromaticity (u',v') of the liquid crystal display device in the directions defined by the azimuth angle of from 0° to 360° and the polar angle of 60° respectively. The maximum value of Δu'v' is represented by $\Delta u'v'_{max}$.

The results are shown in the following table.

The invention claimed is:

1. A cellulose acylate film comprising a cellulose acylate satisfying relations (I)-(III):

$$2.0 \leq A+B \leq 2.45, \quad \text{(I)}$$

$$0.8 \leq A \leq 1.4, \text{ and} \quad \text{(II)}$$

$$0.6 \leq B \leq 1.65 \quad \text{(III)}$$

where "A" represents a degree of acetyl substitution of hydroxy in a glucose unit of cellulose acylate; and "B" represents a degree of with $C_3$ or longer acyl substitution of hydroxy in a glucose unit of cellulose acylate; and satisfying relations (IV)-(VI)

$$50 \text{ nm} \leq Re(590) \leq 70 \text{ nm}, \quad \text{(IV)}$$

$$100 \text{ nm} \leq Rth(590) \leq 120 \text{ nm, and} \quad \text{(V)}$$

$$1.4 \leq Rth(590)/Re(590) \leq 2.6 \quad \text{(VI)}$$

where, in relations (IV) and (VI), Re(λ) indicates retardation (unit: nm) in-plane for an incident light having a wavelength of λnm at 25 degrees Celsius and 60% RH; and in relations (V) and (VI), Rth(λ) indicates retardation (unit: nm) along the thickness direction for an incident light having a wavelength of λnm at 25 degrees Celsius and at 60% RH.

2. The cellulose acylate of claim 1, which satisfies relations (VII) and (VIII):

$$0 \text{ nm} \leq Re(630) - Re(450) \leq 10 \text{ nm, and} \quad \text{(VII)}$$

$$0 \text{ nm} \leq Rth(630) - Rth(450) \leq 15 \text{ nm} \quad \text{(VIII)}.$$

TABLE 5

| LCD No. | Polarizing Plate at Displaying Side | | Polarizing Plate at Backlight Side | | CR in Oblique Direction | | Color shift in Oblique Direction | Note |
|---|---|---|---|---|---|---|---|---|
| | Protective Film (Front)*1 | Protective Film (Cell)*2 | Protective Film (Cell)*2 | Protective Film (BL)*3 | Before*4 | After*5 | Δu'v' | |
| LCD101 | Film A-1*6 | 101 | 101 | FUJITAC TD80UL | 60 | 50 | 0.065 | Invention |
| LCD102 | Film A-1*6 | 102 | 102 | FUJITAC TD80UL | 65 | 55 | 0.095 | |
| LCD103 | Film A-1*6 | 103 | 103 | FUJITAC TD80UL | 80 | 75 | 0.11 | |
| LCD104 | Film A-1*6 | 104 | 104 | FUJITAC TD80UL | 70 | 70 | 0.095 | |
| LCD105 | Film A-1*6 | 105 | 105 | FUJITAC TD80UL | 60 | 65 | 0.03 | |
| LCD106 | Film A-1*6 | 106 | 106 | FUJITAC TD60UL | 60 | 40 | 0.1 | |
| LCD107 | Film A-1*6 | 107 | 107 | FUJITAC TD60UL | 70 | 60 | 0.12 | |
| LCD108 | Film A-1*6 | 108 | 108 | FUJITAC TD60UL | 70 | 65 | 0.11 | |
| LCD109 | Film A-1*6 | 109 | 109 | FUJITAC TD60UL | 70 | 70 | 0.11 | |
| LCD110 | Film A-1*6 | 110 | 110 | FUJITAC TD80UL | 10 | 10 | 0.065 | Comparative Example |
| LCD111 | Film A-1*6 | 111 | 111 | FUJITAC TD80UL | 1 | 1 | 0.015 | |
| LCD112 | Film A-1*6 | 112 | 112 | FUJITAC TD80UL | 40 | 30 | 0.02 | |
| LCD113 | Film A-1*6 | 113 | 113 | FUJITAC TD80UL | 35 | 25 | 0.02 | |
| LCD114 | Film A-1*6 | 114 | 114 | FUJITAC TD60UL | 40 | 45 | 0.02 | |
| LCD115 | Film A-1*6 | 115 | 115 | FUJITAC TD60UL | 40 | 50 | 0.04 | |
| LCD116 | Film A-1*6 | 116 | 116 | FUJITAC TD60UL | 40 | 30 | 0.03 | |
| LCD117 | Film A-1*6 | 117 | 117 | FUJITAC TD60UL | 40 | 45 | 0.015 | |
| LCD118 | Film A-1*6 | 118 | 118 | FUJITAC TD60UL | 80 | 77 | 0.13 | |
| LCD119 | Film A-1*6 | 119 | 119 | FUJITAC TD60UL | 70 | 65 | 0.14 | |
| LCD120 | Film A-1*6 | 120 | 120 | FUJITAC TD80UL | 60 | 40 | 0.14 | |

*1Protective film disposed at the observed side;
*2Protective film disposed at the liquid crystal cell side;
*3Protective film disposed at the backlight side;
*4The contrast ratio in oblique direction measured initially;
*5The contrast ratio in oblique direction after the heat-treatment; and
*6Antiglare-Antireflection Film A-1

3. The cellulose acylate film of claim 1 which satisfies relations (IVb)-(VIb):

$$60 \text{ nm} \leq Re(590) \leq 70 \text{ nm}, \quad \text{(IVb)}$$

$$100 \text{ nm} \leq Rth(590) \leq 110 \text{ nm, and} \quad \text{(Vb)}$$

$$1.4 \leq Rth(590)/Re(590) \leq 2.0 \quad \text{(VIb)}.$$

4. The cellulose acylate of claim 1, wherein the cellulose acylate satisfies $0.65 \leq B \leq 1.55$.

5. A method for producing a cellulose acylate film of claim 1, comprising in the following order:
casting a solution prepared by dissolving a cellulose acylate satisfying relations (I)-(III):

$$2.0 \leq A+B \leq 2.45, \quad \text{(I)}$$

$$0.8 \leq A \leq 1.4, \text{ and} \quad \text{(II)}$$

$$0.6 \leq B \leq 1.65 \quad \text{(III)}$$

where "A" represents a degree of acetyl substitution of hydroxy in a glucose unit of cellulose acylate; and "B" represents a degree of with $C_3$ or longer acyl substitution of hydroxy in a glucose unit of cellulose acylate;
in a solvent on a support;
drying the cast solution on the support to form a web; and
peeling the web having a residual solvent amount of from 10 to 75% by mass from the support.

6. The method of claim 5, wherein an averaged drying rate for just a minute after casting the solution on the support is from 6 to 20 mass %/sec.

7. The method of claim 5, wherein an averaged drying rate for just 30 seconds after casting the solution on the support is from 8 to 30 mass %/sec.

8. The method of claim 5, comprising drying the cast solution on the support within a minute after casting the solution by providing the cast solution with blowing gas having a temperature of 50 degrees Celsius to 150 degrees Celsius and a wind speed of 3 to 15 m/sec.

9. A polarizing plate comprising a cellulose acylate film of claim 1.

10. A liquid crystal display device comprising a polarizing plate of claim 9.

11. The liquid crystal display device of claim 10, comprising a VA-mode liquid crystal cell.

12. A polarizing plate comprising a cellulose acylate film of claim 2.

13. A liquid crystal display device comprising a polarizing plate of claim 12.

14. The liquid crystal display device of claim 13, comprising a VA-mode liquid crystal cell.

15. A polarizing plate comprising a cellulose acylate film of claim 3.

16. A liquid crystal display device comprising a polarizing plate of claim 15.

17. The liquid crystal display device of claim 16, comprising a VA-mode liquid crystal cell.

18. A polarizing plate comprising a cellulose acylate film of claim 4.

19. A liquid crystal display device comprising a polarizing plate of claim 18.

20. The liquid crystal display device of claim 19, comprising a VA-mode liquid crystal cell.

* * * * *